United States Patent
Mueller et al.

(10) Patent No.: US 7,721,967 B2
(45) Date of Patent: May 25, 2010

(54) REMOTE CRANE BAR CODE SYSTEM

(75) Inventors: Robert Eric Mueller, Milton (CA); Aly Shivji, Astoria, NY (US); Kan Li, Toronto (CA)

(73) Assignee: Arcelormittal Dofasco Inc., Hamilton, Ontario (CA)

( * ) Notice: Subject to any disclaimer, the term of this patent is extended or adjusted under 35 U.S.C. 154(b) by 866 days.

(21) Appl. No.: 11/519,778

(22) Filed: Sep. 13, 2006

(65) Prior Publication Data

US 2007/0007354 A1    Jan. 11, 2007

Related U.S. Application Data

(63) Continuation-in-part of application No. 11/202,188, filed on Aug. 12, 2005, now Pat. No. 7,370,803.

(60) Provisional application No. 60/601,183, filed on Aug. 13, 2004.

(51) Int. Cl.
G06K 7/10       (2006.01)
G06K 19/06     (2006.01)

(52) U.S. Cl. .................. 235/470; 235/383; 235/385; 235/462.08; 235/462.14; 235/462.25; 235/472.01; 235/494

(58) Field of Classification Search .......... 235/375, 235/383, 385, 462.08, 462.25, 472.01, 462.14
See application file for complete search history.

(56) References Cited

U.S. PATENT DOCUMENTS 3,958,102 A    5/1976   Burt
4,939,355 A    7/1990   Rando et al.
5,256,864 A    10/1993  Rando et al.

OTHER PUBLICATIONS

HI-TECH solutions, Advanced Image Processing Products, SeeCrane Crane Mounted Recognition System, product description available from http://www.htsol.com/Products/SeeCrane.html, accessed Jul. 2004.

INFOSIGHT® Corporation "We Barcode Difficult Stuff", Opticode® Vision Bar Code Reader, product description available from http://www.infosight.com/opticode.htm, accessed Jul. 2004.

Primary Examiner—Thien M. Le
Assistant Examiner—Tuyen K Vo
(74) Attorney, Agent, or Firm—Alexander S. Ross, Esq.; Steven M. Greenberg, Esq.; Carey, Rodriguez, Greenberg & Paul, LLP

(57) ABSTRACT

In general terms, the present invention provides a method of automatically scanning an inventory field to allow the selection of a desired item for retrieval. A camera is positioned in the crane trolley located above the field. The camera continuously performs a scan of the field displaying an image to the operator of the items being scanned. This real-time image allows the operator to distinguish between items scanned in the field. The operator can subsequently choose the desired item triggering the camera system to automatically capture desired information from the item which is in turn communicated to an inventory control system. The camera system mitigates the requirement of a second individual to communicate information between the field and the operator.

20 Claims, 22 Drawing Sheets

REMOTE CRANE BAR CODE SYSTEM

This application is a continuation-in-part of U.S. patent application Ser. No. 11/202,188 filed on Aug. 12, 2005 now U.S. Pat. No. 7,370,803, which claims priority from U.S. Patent Application No. 60/601,183 filed on Aug. 13, 2004.

FIELD OF THE INVENTION

The present invention relates to a method and apparatus for remotely reading an identifier on an object.

BACKGROUND OF THE INVENTION

Items produced in a manufacturing environment will typically be stored in a warehouse for shipping at a later date. A shipping warehouse will typically house a plurality of products, which are made by differing processes or have different characteristics. This collection of warehouse items may be referred to as the 'field'. The field can be substantially large and therefore may be organized into a set of defined locations resembling a 'grid'. The warehouse items are placed at appropriate locations within the grid and these locations are recorded, creating a mapping of the items for subsequent rearrangement or retrieval. A shipping order will typically comprise a combination of dissimilar items from this field requiring this combination of items to be located and collected to complete the shipping order. This shipping order is sometimes referred to as a shipping manifest or lift ticket. Further to gathering items for a shipping order, it may be necessary or beneficial to rearrange or move around the items in the field to optimize floor space or to enable a more efficient arrangement of the items.

When the items manufactured are of substantial dimension and weight, it is typically necessary to retrieve the items from the field using an overhead crane or similar device capable of lifting and transporting items of such dimension and weight. The use of an overhead crane requires the operator of the crane to either be placed at a remote location relative to the field (in the cab of a crane for example) or to operate the crane with a remote control device at field level. When the operator is at a remote distance, the operator may be unable to distinguish between items in the field that are required for a given shipping order. This situation is of particular concern where items are of similar shape but different characteristics, such as in the steel industry where coils of stock that are produced with differing specifications appear similar, especially when viewed from a distance. If the operator uses a remote control device to operate the crane, navigating the field while moving the crane, and reading and scanning the items becomes quite cumbersome for one person. Furthermore, the use of one person at the field level to control the crane, identify the items of interest and scan the item becomes cumbersome due 3 the need for multiple devices to both control the crane and scan the item.

If the crane operator is remotely located relative to the field, a second individual is required to identify the existence and position of the desired items at the field level, to scan the desired items and communicate this information to the operator. The communication between the two individuals is required to identify the item of interest for rearrangement or shipping purposes.

The use of two individuals to gather items in a shipping order tends to be both inefficient and labour intensive given the task to be completed. In the steel industry where the items in the field are of substantial size and weight, the individual assigned to track the appropriate items at the field level would find the method of scanning to be not only time consuming but also dangerous. The inadvertent movement of large items on the field poses a threat to the safety of the individual at the field level and the large area of the field does not lend itself to an efficient method for identifying the desired items in the shipping order.

In the steel industry where the items in the field are large coils, typically the individual at the field level manually scans a barcode found on a tag affixed to the coil. This introduces a possibility for human error. The human error can lead to the processing of incorrect coils, which could possibly generate an incorrect shipment to the customer. Further to the time-related inefficiencies and inherent safety risk, the use of a field level individual requires additional floor space for the above-mentioned navigation of the field. By eliminating the use of a floor operator, less floor space would be required. This is due to a reduction in the required size of the lane ways between adjacent coils. Space is then only required to accommodate the jaws of the crane's picker. This requires an apparatus capable of viewing the field from a distance.

To remotely view labels and barcodes, it has been known to use a camera mounted in a fixed position whereby movement of an item into the field-of-view of the camera allows for remote viewing of a label. This method however requires the position of the labels to be known and the correct item to have been picked by the crane in advance of the camera scan.

Another method of reading labels and barcodes remotely involves a moveable camera capable of tilting, panning and zooming to focus on a desired label or barcode. This method however, requires additional operations to be manually executed by the operator of the crane to identify not only the item of interest but also to correctly centre and zoom in on the label for reading. These additional operator interactions impose an additional opportunity for human error.

It is therefore an object of the present invention to provide a method and apparatus to obviate or mitigate the above disadvantages.

SUMMARY OF THE NVENTION

In general terms, one aspect of the present invention provides a method for remotely scanning objects including the steps of using an imaging system to display an image of the objects on an interface, receiving a location input related to an identification tag which is attached to a desired object based on a location in the image, using the location input to orient the imaging system towards the identification tag, magnifying the identification tag, and reading information identifying characteristics of the desired object provided by the identification tag.

In another aspect, the present invention provides a system for remotely scanning objects comprising an imaging system positioned remotely from the objects and arranged to image the objects. The imaging system has an adjustable lens for magnifying the image. The system also comprises an interface for displaying an image of the objects and is adapted for receiving a location input for an identification tag attached to a desired object based on a location in the image. The system also comprises a processor connected to the imaging system and the interface. The processor uses the location input to orient the imaging system towards the tag, commands the adjustable lens to magnify the tag, and reads information identifying characteristics of the desired object provided by the tag.

In yet another aspect, the present invention provides a method for aligning a tag in an image, the tag being affixed to an object and having indicia thereon. The method has the steps of obtaining an image of the object having at least a portion of the tag visible in the image; arranging at least one sensor on the image; identifying at least one marking on the tag using the at least one sensor, the at least one marking being indicative of the position of the tag in the image or of the presence of a particular feature of the tag; computing an average position of the markings to determine a deviation of the average position from a preferred position; and aligning the tag in the image according to the deviation.

BRIEF DESCRIPTION OF THE DRAWINGS

Embodiments of the invention will now be described by way of example only with reference to the appended drawings wherein.

DETAILED DESCRIPTION OF THE INVENTION

Figure 1:
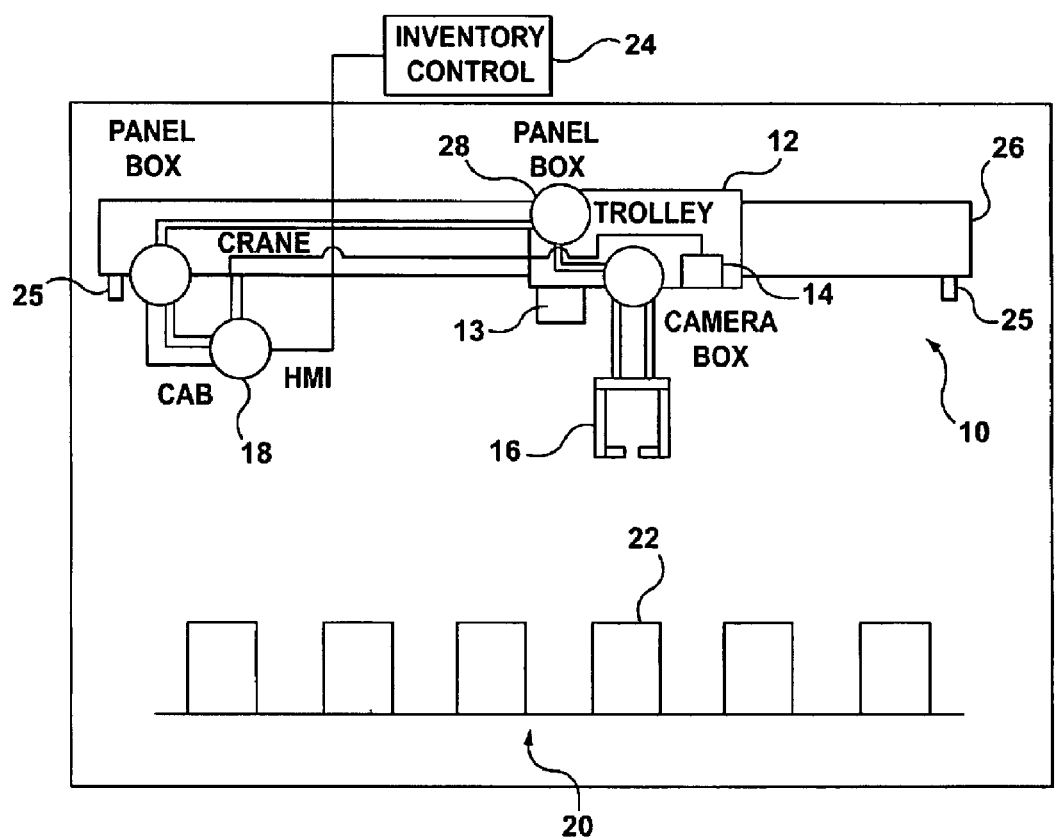
FIG. 1 is a schematic representation of a remote crane barcode scanning system.

Referring therefore to FIG. 1, an overhead crane system 10 is positioned above a field of inventory 20, the inventory in this embodiment being coils 22 of steel varying in specification. The coils 22 are initially placed in the field 20 and the respective positions of the coils 22 in the field 20 recorded using a range finder system 13 or other means. Each position may then be correlated to its respective coil 22 using the system 10 or other suitable methods. The correlation of position to coil 22 enables an operator of the system 10 to at a later time target a particular area of the field in order to locate and scan the coil 22 to determine if it remains at its recorded position.

The overhead crane system 10 includes a trolley 12 mounted upon a bridge 26 and has a communication connection to an operator cab 18, preferably over a festoon cable to accommodate movement of the trolley 12 relative to the cab 18. The cab 18 is situated in a fixed position at one end of the bridge 26. An inventory control system 24 includes location coordinates and inventory information, and also has a communication connection with the operator cab 18. The trolley 12 includes a set of motors 28 to facilitate translation of the trolley 12 along the bridge 26. Typically the bridge 26 is mounted on rails 25 transverse to the bridge 26 allowing the bridge 26 to translate fore and aft along the rails 25.

Translation of the bridge 26 and the trolley 12 in the directions indicated allows the trolley 12 to access objects located anywhere in the field 20. The trolley 12 furthermore includes a picker 16 for vertically hoisting coils 22 from the field 20, a camera system 14, and the range finder system 13 having separate range finders for locating the trolley's position along each axis of the field 20.

Figure 19:
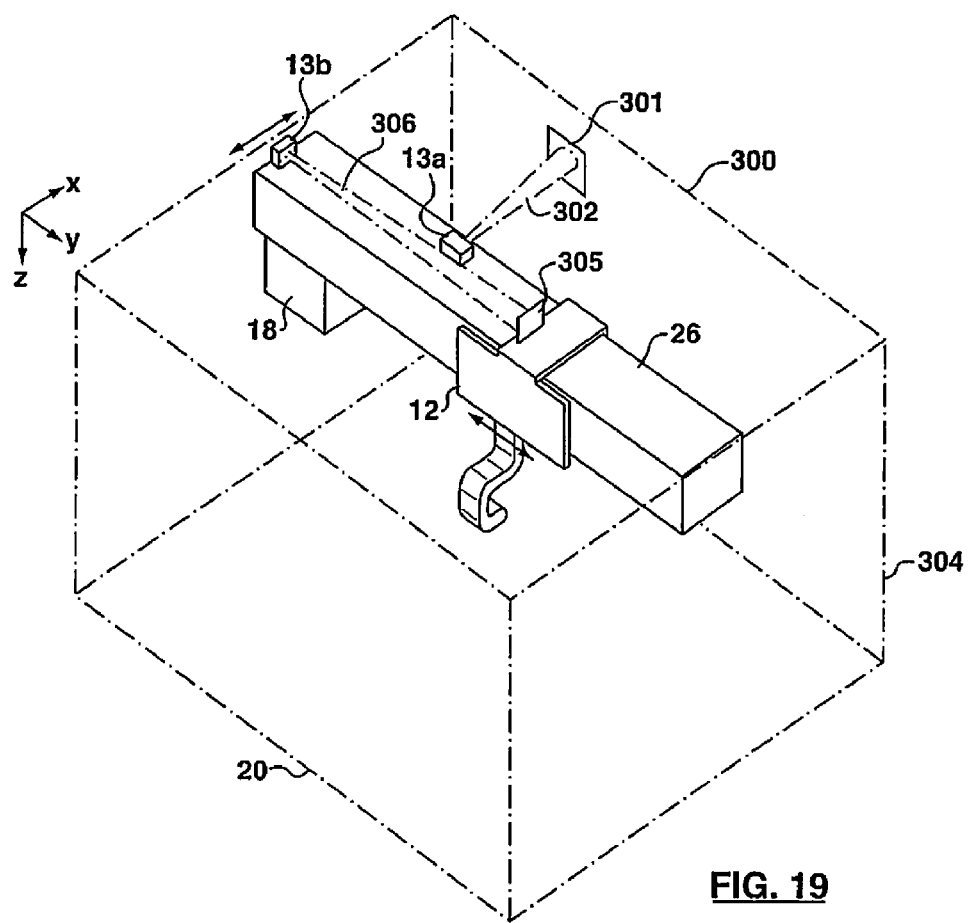
FIG. 19 is a perspective view showing an arrangement for the laser rangefinder system of FIG. 1.

In one arrangement shown in FIG. 19, a first range finder 13a is mounted on the bridge 26 and is aligned in the y-direction with a first reflection plate 301. The reflection plate 301 is mounted on a wall 300 parallel to the length of the bridge 26. A second range finder 13b is mounted at one end of the bridge 26 and opposite the trolley 12 such that it will remain fixed in the y-direction irrespective of the position of the bridge 26. The range finder 13b is aligned in the x-direction with a second reflection plate 306 that is mounted to the trolley 12 and that is parallel to a wall 304 which is in turn perpendicular to the wall 300. It will be appreciated that any arrangement can be used that is capable of determining both x and y coordinates.

The range finder 13a transmits a laser beam 302 that reflects off of the reflection plate 301 and returns to the range finder 13a in order to measure the current x-coordinate for the bridge 26 and trolley 12. The second range finder 13b transmits a second laser beam 306 that reflects off of the reflection plate 305 and returns to the range finder 13b in order to measure the current y-coordinate for the trolley 12. The range finders 13a, 13b are connected to the system 10 and provide an ongoing measurement of the position of the trolley 12 in the field 20 for correlating a particular coil 22 to a particular location as explained in further detail below.

Figure 2:
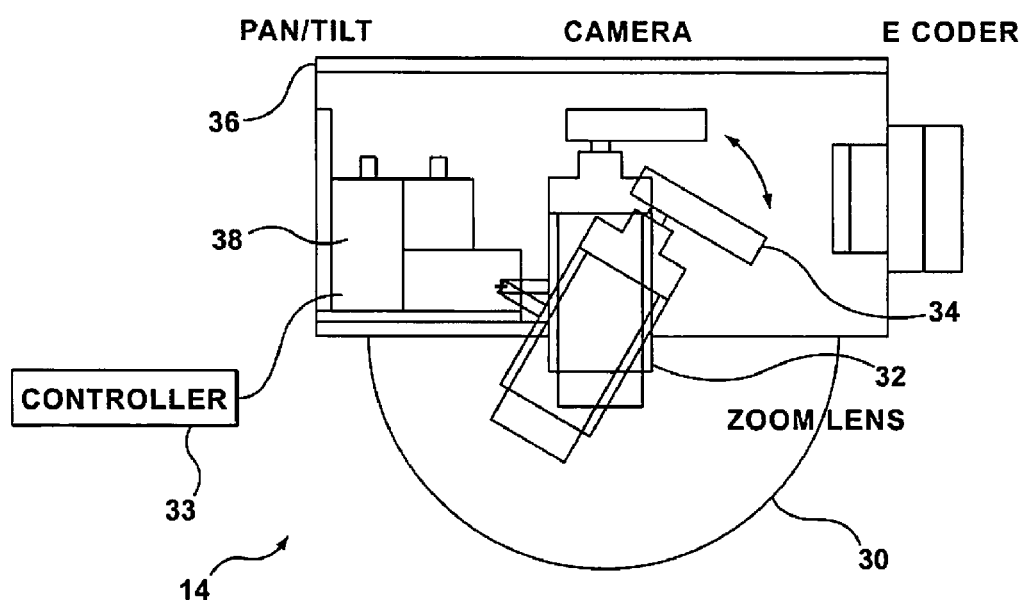
FIG. 2 is a schematic representation of a scanning camera.

The camera system 14 can be seen in greater detail when referring to FIG. 2. The camera system's components are housed within a casing 36 and this casing 36 is mounted to the underside of the trolley 12. A zoom lens 32 of a camera 34 protrudes beyond the lower surface of the casing 36, which is partially open and covered by a transparent acrylic enclosure 30. The camera 34 is preferably a "smart" camera, which is a camera having a microprocessor capable of processing image data. This functionality enables the camera 34 to process information related to the coils 22, that are acquired in an image.

The processing may also be done remotely from the camera 34 in a separate processor. The acrylic enclosure 30 allows movement of the zoom lens 32 within its volume and is transparent, allowing the lens 32 to capture images. The camera 34 is controlled by a pan/tilt mechanism 40. The pan/tilt mechanism 40 can orient the camera 34 using various pan and tilt operations in order to point the camera 34 towards a desired area of the field 20. A motor 38 is incorporated within the pan/tilt mechanism 40 and controls its movements. The motor 38 is controlled by an electronic controller 33 which has a communication connection to the smart camera 34 or other system control computer (not shown).

Figure 20:
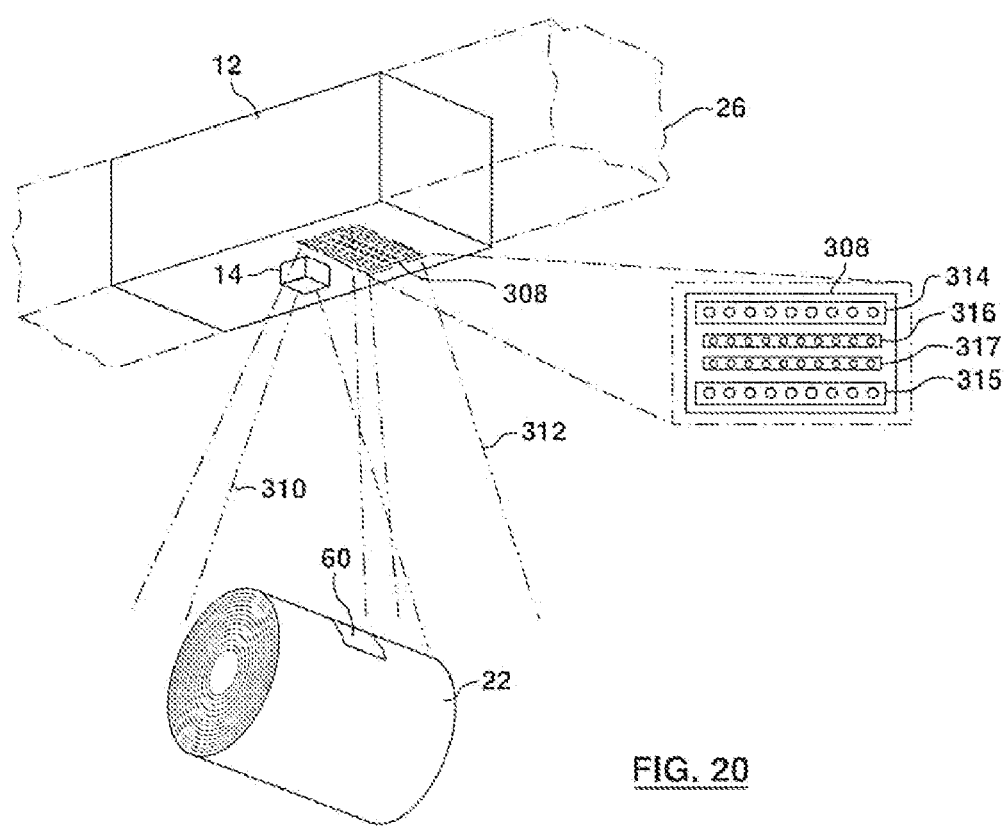
FIG. 20 is a perspective view of the underside of the trolley of FIG. 1 incorporating an illumination system.

Referring now to FIG. 20, the lens 32 of the camera system 32 has a field of view 310 that when properly focussed can image a barcode 60 on a coil 22. In a shipping or storage facility, often regions of the facility have poor or uncontrolled ambient light and in some cases having no ambient light is preferable. In order to most effectively capture an image of the barcode 60, an adequate amount of ambient light should be provided at least in the region of the camera lens' field of view 310. As seen in FIG. 20, a localized illuminated region 312 is provided by an illumination system 308 mounted to the underside of the trolley 12, whereby, as the camera system 14 moves, so does the illumination system 308. It will be appreciated that the light can be arranged in any suitable configuration with respect to the camera system 32 and should not be limited to only the configuration shown in FIG. 20.

FIG. 20 shows the illumination system in isolation. The system 308 comprises four linear light arrays. Preferably, a pair of red LED linear lights 314, 315 sandwich a pair of infrared LED linear lights 316, 317. The red LEDs 314, 315 are arranged above the picker 16 and aimed at the underlying coil 22 to illuminate that coil 22 and the surrounding floor of the field 20 at all times. The infrared LED lights 316, 317 are preferably synchronized with the camera's exposure time during readings and are normally off when not scanning to prolong their lifespan. Therefore, it can be seen that even in low or non-existent ambient light conditions, the region directly below the camera system 14 is provided with sufficient illumination to enable a useful image to be captured. It will be appreciated that any colour of LED can be used and should not be limited to red. Suitable linear lights are those produced by Spectrum Illumination™.

Figure 3:
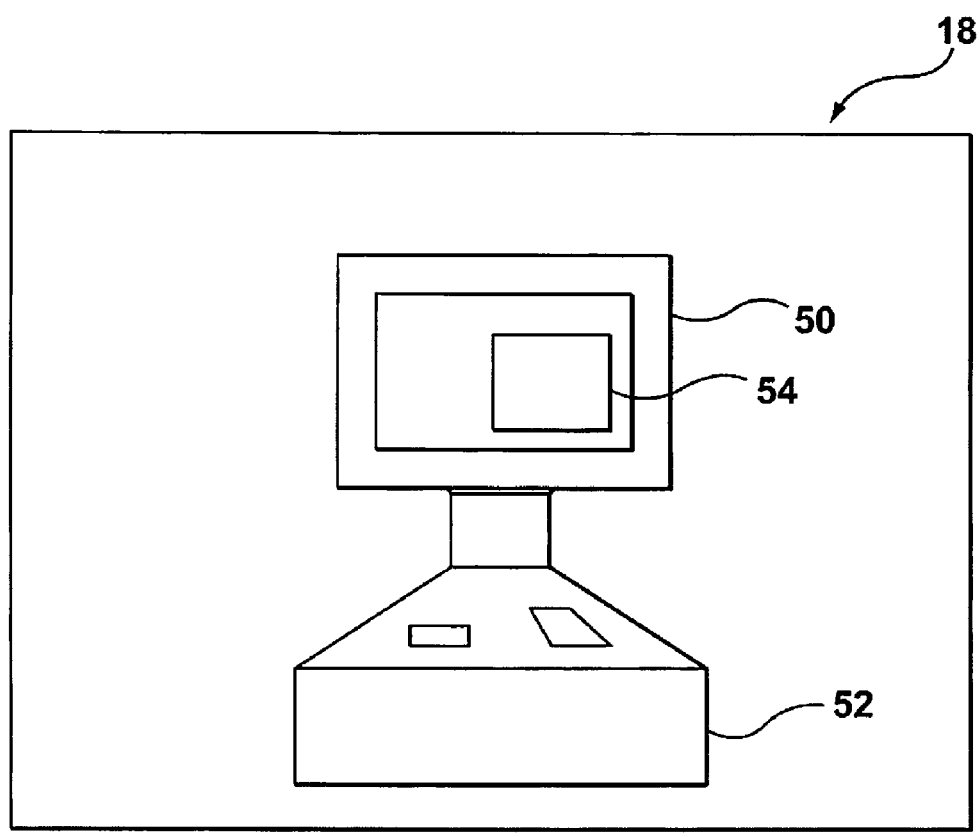
FIG. 3 is a view of the operator control interface within a crane cab.

The interface located within the operator cab 18 is shown in FIG. 3. The cab 18 contains a computer interface 50 which includes a touchscreen 54. A control console 52 allows the operator to control manually, the movements of the trolley 12.

Figure 14:
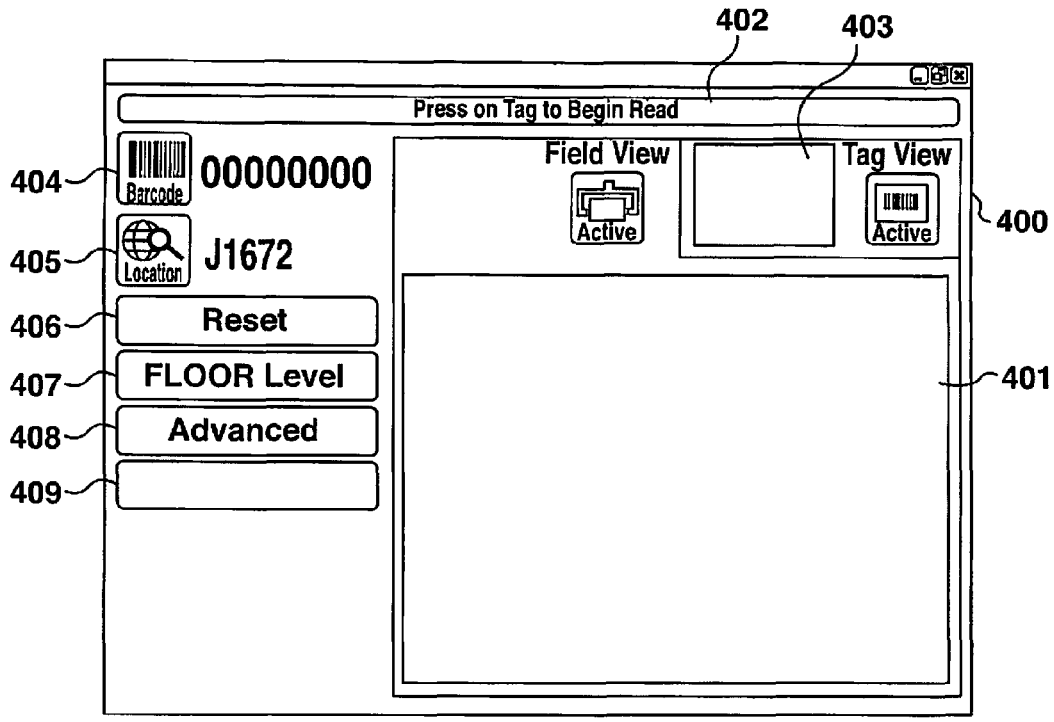
FIG. 14 is a screen shot of an embodiment of the operator interface shown in FIG. 3 incorporating diagnostic features.

To obtain maximum control and flexibility, an industrial PC can be used for the computer interface 50 that runs a visual basic (VB) API 400 (see FIG. 14). The industrial PC integrates, via serial and Ethernet ports, all the communication elements and displays the camera feeds. A typical industrial PC has five serial ports and can be made responsible for the touch screen input, the x and y laser range finder inputs, the barcode output, and the location output. The Ethernet port can be connected to the local camera network for the camera system 14 that is used to display the camera feeds while sending and receiving information from the cameras. The VB interface can continuously calculate and update the location and can output the barcode and location information to the inventory system 24 as described in greater detail below. The VB interface can also be used to automatically control the camera zoom and focus algorithms to accommodate changing floor levels. The flexibility that is inherent in using a platform such as VB advanced lens control can be implemented to control the iris, focus and zoom levels to accommodate abnormally sized barcode tags and for calibrating a new system 10.

Figure 4:
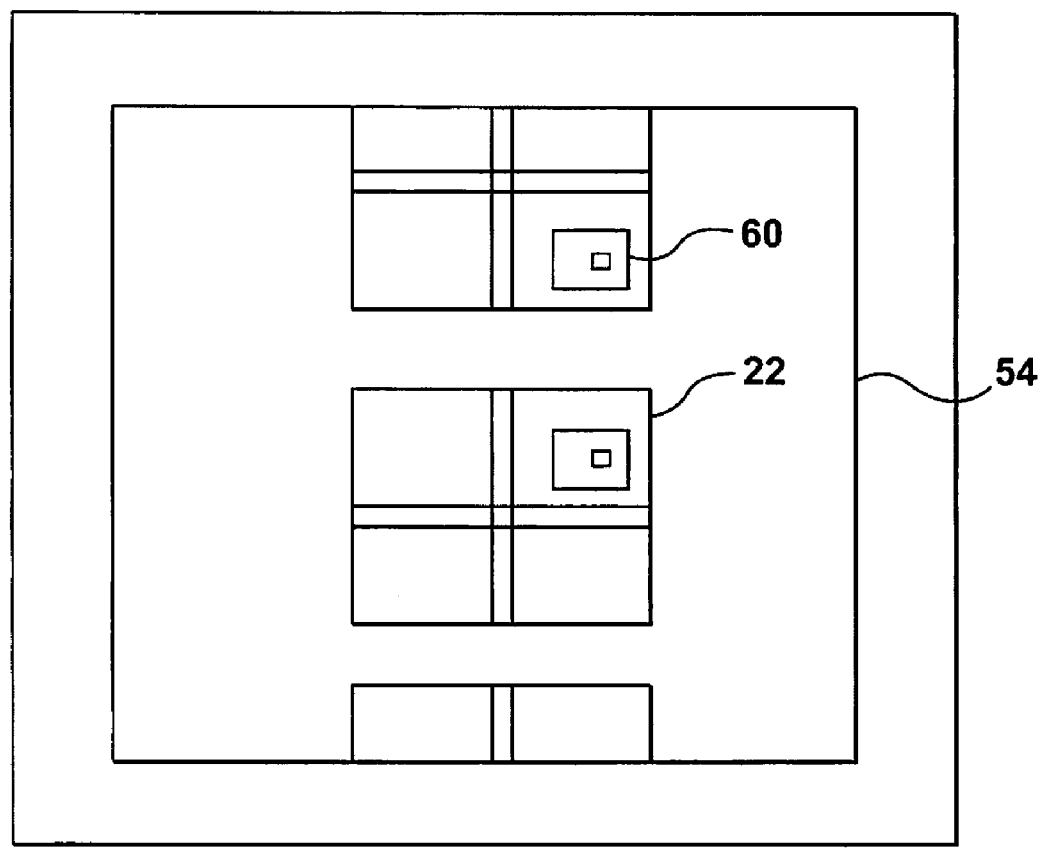
FIG. 4 is an enlarged view of the touchscreen transmitting an image of the field to the operator via the camera of FIG. 2.
Figure 5A:
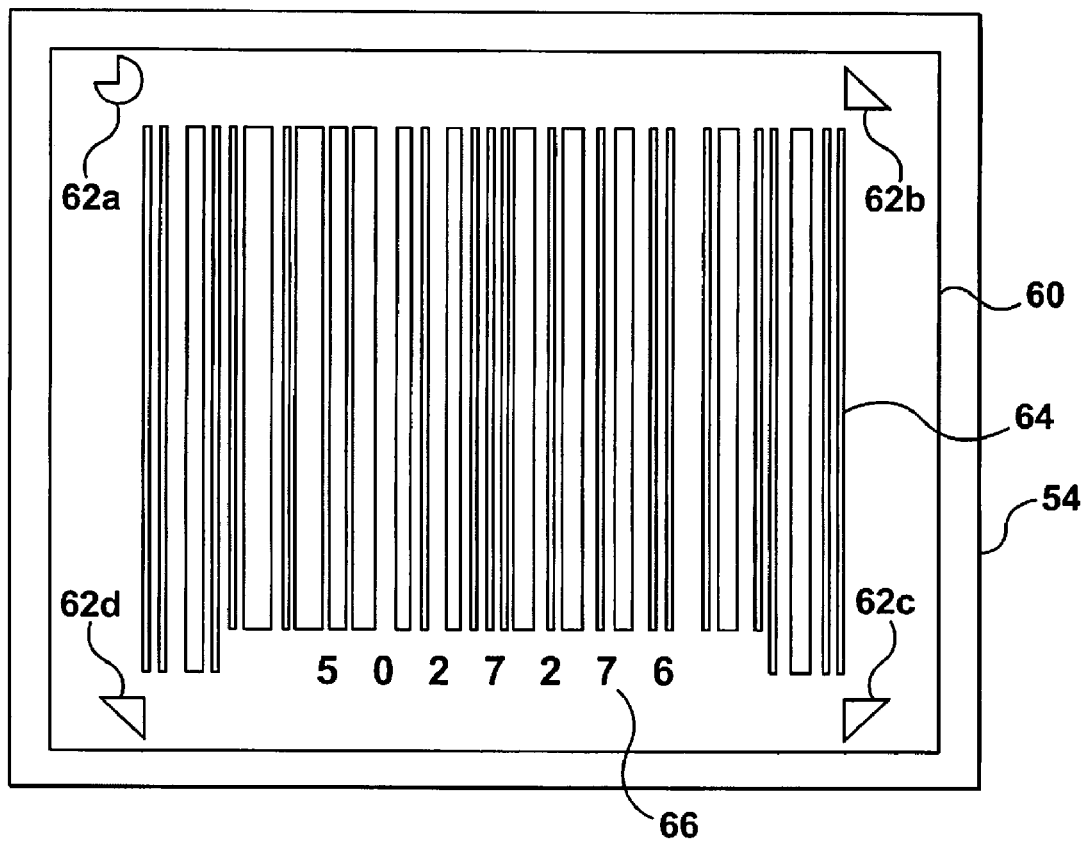
FIG. 5a shows an inventory tag.

Making reference now to FIG. 4, the touchscreen 54 displays the images acquired by the camera system 14. These images show objects in the field 20 and in this particular example are coils of steel 22. The coils 22 are of differing specifications, and information pertaining to the coil 22 is stored on a tag 60. The tags 60 are intended to be affixed to the upward facing surfaces of the coils 22 typically in an unspecified manner and therefore do not appear at consistent locations on the upward facing surfaces of the coils 22 or in consistent orientations thereon. The information found on the tag 60 is unreadable from the distance that the operator is located and therefore must be magnified by the camera system 14. A tag 60 is shown in FIG. 5a. The tag 60 includes a barcode 64, a numerical code 66 and a set of alignment markers 62. An alignment marker 62 is located in the proximity of each of the four corners of the barcode 64. One alignment marker 62a is dissimilar to the other alignment markers 62b, 62c, 62d. The dissimilar alignment marker 62a is used by the camera system 14 to determine the orientation of the tag 60 in the image. The orientation of the tag 60 allows the camera system 14 to choose the appropriate direction to perform the barcode scan.

In FIG. 5a, the dissimilar marker 62a is located in the top-left portion of the image with respect to the other markers 62b, 62c, 62d. The dissimilar marker 62a includes a triangular notch which points towards the centre of the barcode 64. The remaining three markers are triangular in shape and are rotated 90° with respect to each other such that they each point towards the centre of the barcode 64. The alignment markers 62 are located at substantially equal distances from the centre of the barcode 64. These distances are known proportions of the tag's size (for instance a proportion of the width). These proportions and the tag size itself are programmed into the camera system 14. The camera system 14 can use the width of the tag 60 seen in the image to establish scale. Distances can be measured from the alignment markers 62 based on the established scale, the known proportions and the resolution of the camera system 14. The barcode 64 and the numerical code 66 contains identification information pertaining to the coil 22 to which the tag 60 is affixed.

Figure 6:
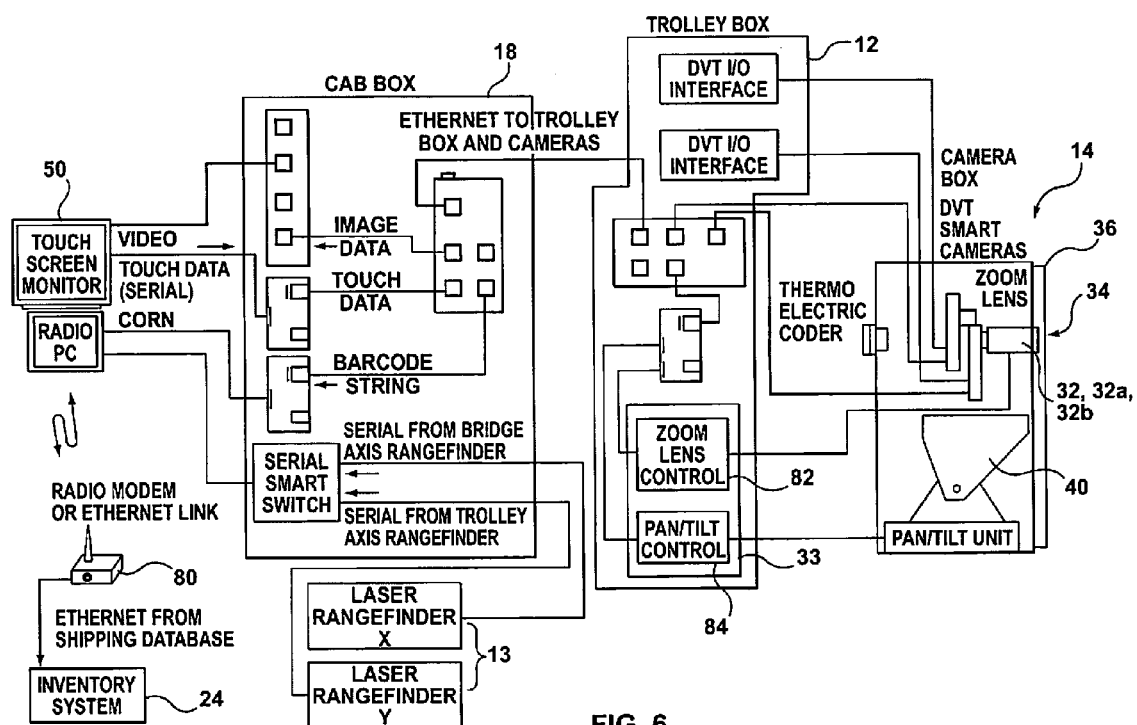
FIG. 6 is a schematic representation of the system.

The communication connections are schematically shown in FIG. 6. The electronic controller 33 includes a zoom controller 82 operating the zoom lens 32 and a pan/tilt controller 84 operating the pan/tilt mechanism 40. The controller 82 commands the motors 38 (not shown) facilitating the movement of the zoom lens 32 (or 32b in a two camera system—explained later). The controller 84 commands the motors 38 facilitating the movement of the pan/tilt mechanism 40. In this particular embodiment, the inventory control system 24 is connected to the operator interface 50 via a wireless Ethernet link 80. It will be appreciated that any of the communication connections described herein may be hard wired or wireless. It will also be appreciated that the touchscreen 50 and operator interface may alternatively be located away from the crane at a remote location, and operated via the communication link 80. In such an arrangement, control of the crane and the picker 16 can be performed from any location.

Figure 7:
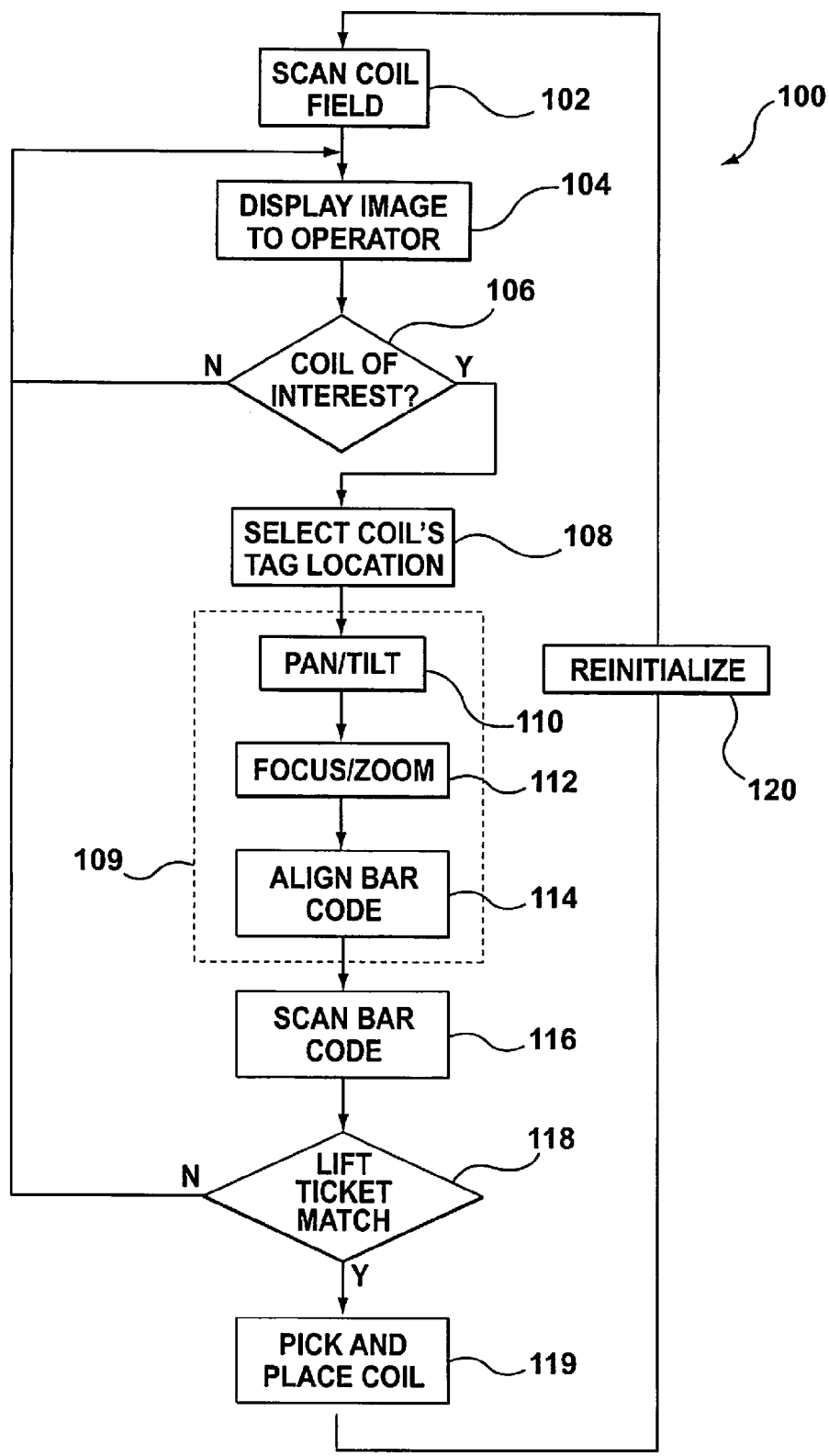
FIG. 7 is a flow chart representing one embodiment of the field scanning process.

Referring to FIG. 7, an automatic scanning process 100 involves a continuous scan of the coil field 102. Referring also to FIG. 1, the camera system 14 is mounted on the underside of the trolley 12 and therefore scans the field 20 below as the operator navigates the trolley 12. Images captured are displayed to the operator 104 as shown in FIG. 4. Coils 22 are observed during this scanning process 100 and the operator must decide whether the coil 22 shown is of interest for reading 106. If the coil 22 is not of interest to the operator, the operator will continue to monitor the image 104 until a coil 22 does appear that is of interest for reading. When a coil 22 appears that is of interest, the operator first indicates whether the coil 22 is situated at a relative far position such as on the floor or at a relative near position such as being mounted in a secured and elevated position on a truck bed. This is done by selecting a "Near" setting or "Far" setting on the touchscreen 54. The settings represent the nominal magnifications required by the camera system 14 to be able to read a tag 60 at the corresponding distance. It will be appreciated that there may be any number of magnification levels that can be chosen and should not be limited to only "Near" and "Far" settings. The operator then selects the coil 108 by touching the image of the particular coil 22 at the position which its tag 60 appears on the touchscreen 54.

It will be appreciated that the camera system 14 may also use the range finder system 13 to determine where the trolley 12 is in the building and whether it is over a floor area or a loading bay (truck mounted coils) to automatically adjust the magnification and focus to appropriate settings without operator input.

In such an embodiment, the arrangement shown in FIG. 19 is preferably used along with a pre-stored lookup table that includes information pertaining to the floor layout of the field 20. The two range finders 13a, 13b obtain the x and y coordinates of the shipping facility in real-time. The lookup table is used to determine if the (x, y) position is over the floor or a truck bed (as one example) and using this information, the system determines the appropriate zoom and focus for the particular coil 22 and instructs the motorized lens 32 accordingly. Similarly, when a coil 22 is first placed in the field 20, its information can be correlated to the real time position to assign a floor grid location to that coil. Later, when the coil 22 is to be retrieved, an identifier for the coil 22 (e.g. on lift ticket) can be used to determine the location for the coil 22 and the system 10 can automatically position the camera in the vicinity of the coil of interest by tracking the real time coordinates.

At this point, the camera system 14 begins an identification process 109. To begin, the camera system 14 is given a set of co-ordinates from the touchscreen 54 (or rangefinder system 13) representing the position selected by the operator (or automatically detected). These co-ordinates are measured relative to a datum wherein the scale of the image is known based on the wide view magnification used by the camera system 14 and the data provided by the range finder system 13. The datum represents the centre of the field-of-view of the camera system 14. The pan/tilt controller 84 then moves the camera system 14 aligning the datum with the given co-ordinates 110 which places the tag 60 substantially within the centre of the field-of-view of the camera system 14. The camera system 14 also uses the data from the range finder system 13 to map the trolley's position within the field 20 to the given co-ordinates. This provides the inventory control system 24 with a floor grid location to be associated with the tag's information.

This first movement 110 by the pan/tilt mechanism 40 provides a coarse adjustment for centring the tag 60. Following this pan/tilt operation 110, the camera system 14 commands the zoom controller 82 to perform a zoom operation 112, providing an enlarged image of the tag 60. The zoom controller 82 has two predetermined magnifications, one for the "Near" option and one for the "Far" option. Since the tags 60 are presumably affixed to the coils 22 on the upward facing surface, tags 60 with similar designation (specifically "Near" or "Far") will be at a substantially similar distance from the camera system 14. If the operator had selected "Far", the zoom controller 82 magnifies the image to its "Far" setting. If the operator had selected "Near", the zoom controller 82 magnifies the image to its "Near" setting which requires less magnification than the "Far" setting since the coils 22 are positioned closer to the camera system 14. Due to curvature of the upward facing surface of the coils 22, tags 60 of similar designation may be affixed at slightly varying distances. The zoom controller 82 performs minor focusing at this point if necessary to provide adequate sharpness of the image.

It will be appreciated that the camera system 14 may also use a depth measurement device such as an ultrasonic range finder to determine the distance between the tag 60 and the camera system 14. This would allow the zoom controller 82 to choose specific magnifications for each tag 60. This may be necessary in situations where the dimensions of the objects being selected vary substantially.

Figure 5B:
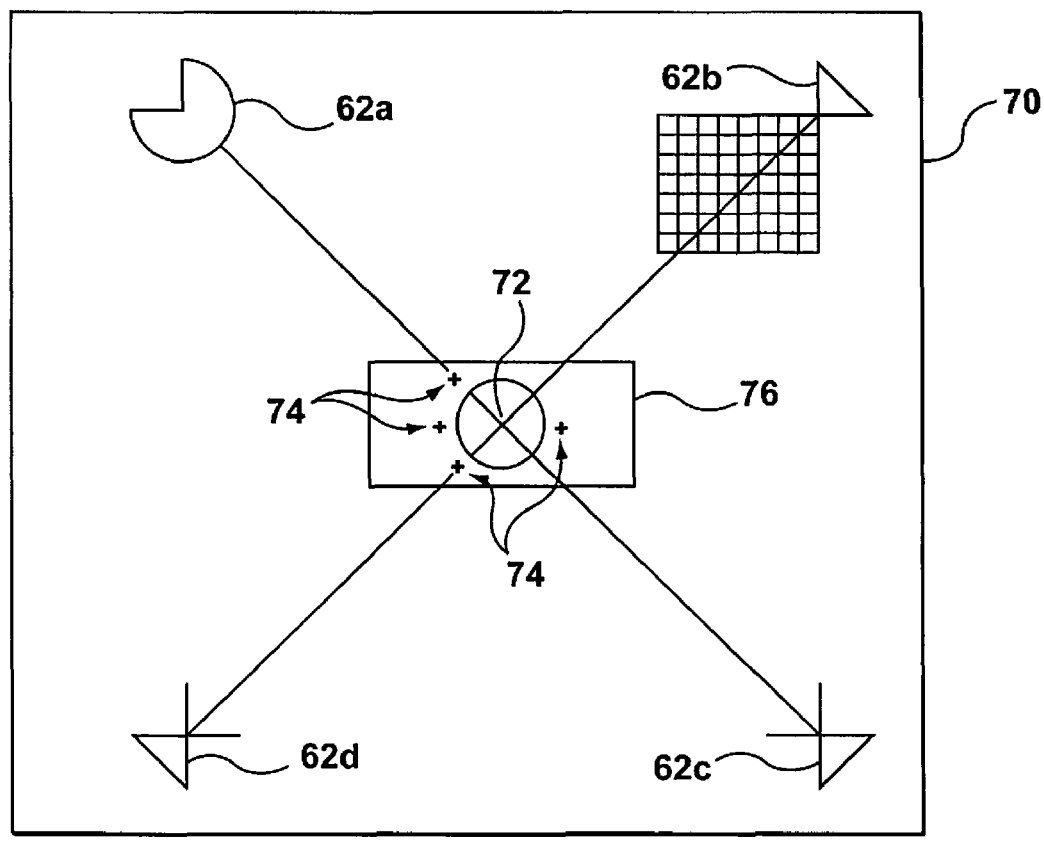
FIG. 5b is a representative schematic of the items identified by the camera system during an image analysis procedure.

Following the zoom operation 112, the camera system 14 performs an alignment adjustment operation 114. Referring now to FIG. 5b, the camera system 14 analyses the image and identifies the location and orientation of each of the alignment markers 62 on the tag 60 using an object-finding routine built into the software used by the imaging system, e.g. smart camera software, and previously programmed to identify markers 62 having a particular size and shape.

The camera system 14 determines the position of the dissimilar marker 62a relative to the other markers and this position dictates the relative orientation of the tag 60 and subsequently the barcode scan direction. If the dissimilar marker 62a is the upper-leftmost of the markers 62 (as shown in FIGS. 5a and 5b) the camera system 14 determines that a left-right horizontal scan is required. If the dissimilar marker 62a is the upper-rightmost of the markers 62 the camera system 14 determines that a top-bottom vertical scan is required. If the dissimilar marker 62a is the lower-leftmost of the markers 62 the camera system 14 determines that a bottom-top vertical scan is required. If the dissimilar marker 62a is the lower-rightmost of the markers 62 the camera system 14 determines that a right-left horizontal scan is required.

Using the locations of the markers 62, the camera system 14 then approximates the centre of the barcode 64. Firstly, since the relative orientation of the tag 60 has been determined, the camera system can measure the width of the tag 60 along the appropriate direction in the image 70. Furthermore, since the actual width of the tag 60 and the camera system's resolution is known, the camera system 14 can correlate pixel width in the image to the actual width on the tag 60. Each marker is a particular distance from the centre of the barcode 64 and is a proportion of the tag's width. The distance is measured along a line in the direction that the marker 62b is pointing and is typically perpendicular to the outermost edge of the marker 62b relative to the barcode 64. Based on the proportion of the tag's width, the actual distance on the tag 60 is converted to a number of pixels in the image. This pixel length is then converted to a set of pixel co-ordinates relative to the marker 62b. Using these relative pixel co-ordinates, the centre of the barcode 64 is approximated and a mark 74 is recorded by the camera system 14. This process is repeated for the other three alignment marks 62a,c,d and the average position 72 of the four marks 74 is calculated and its position is recorded by the camera system 14. These markings are shown in FIG. 5b.

The camera system 14 uses the position of the average centre mark 72 to determine whether the centre mark 72 lies within a window 76 of acceptable positions surrounding the centre of the image 70. If the average centre mark 72 is within the acceptable window 76, the barcode 64 can be read. If the average centre mark 72 is not within this window 76, the pan/tilt controller 84 commands the pan/tilt mechanism 40 to adjust the camera system 14 thereby placing the average centre mark 72 within the acceptable window 76 of the analysed image 70. This alignment of the average centre mark 72 ensures the entire barcode 64 is visible in the image 70 and therefore can be properly scanned.

With the tag 60 magnified 112, properly aligned (per step 114), and its orientation known, a barcode string is generated by the camera system 14 by scanning the bar code 116. The direction of the scan is based on the determined orientation of the tag 60. This barcode string is sent to the operator interface 50 for comparison with the lift ticket 118. If the information acquired does not match an item on the lift ticket, the coil 22 is rejected and the system 100 returns to the field level image for the operator to make another selection. If the barcode 64 does match an item on the lift ticket, the camera system 14 returns to a wider view to allow the coil 22 to be grabbed and lifted by the operator 119 using the crane's picker 16. The automatic scanning process 100 is reinitialised 120 once a coil has been lifted 119 and resumes scanning the coil field 102 until the next operator selection. The system 10 may then interface with the inventory control system 24 to update the stock of coils 22 and process a shipping ticket for delivery of an order of coils 22.

Therefore, the system 10 enables the identification, scanning and retrieval of objects in a field of inventory from a remote location requiring only a single input from an operator. The operator may remotely scan a collection of the objects and select an object of interest based on a predetermined location for that object. This can be done through an input such as touching the image on a touchscreen to indicate the location of an identifier on the object. The imaging system 14 may then automatically magnify the identifier based on the input, and automatically perform an alignment procedure to orient the identifier according to a desired orientation. The system 14 then automatically reads the identifier, e.g. by scanning a barcode 64, and uses information provided by the identifier to confirm the location of the object for processing shipping orders, and update an inventory system 24 accordingly. Only a single operator input using a touch or point of a mouse is needed to execute the above procedure. This effectively replaces a manual pan/tilt/focus/zoom operation with a single initial input.

Figure 8:
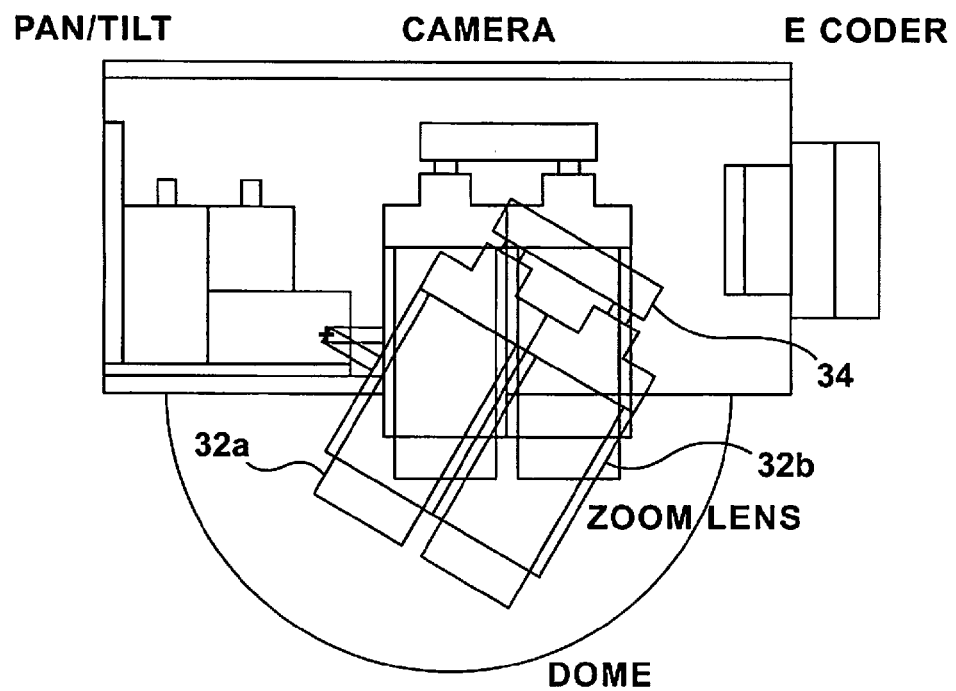
FIG. 8 is an alternative embodiment of the remote crane barcode scanning system of FIG. 1 utilising two cameras.

In a further embodiment of the present invention, the camera system 14 utilises two smart cameras 32a, 32b as shown in FIG. 8. The pair of cameras 32a, 32b are mounted together on the pan/tilt mechanism 40 similar to the apparatus shown in FIG. 2. The first camera 32a is at a fixed magnification and provides a constant overall image of the coils 22 as they are being scanned. The second camera 32b is equipped with a motorised zoom lens similar to the camera lens 32 in the previous embodiment. In this configuration, the second camera 32b maintains a magnification close to the level at which a tag 60 can be read and requires only minor magnification adjustments once the pan/tilt mechanism 40 aligns the second camera 32b with the selected tag 60.

The use of two smart cameras 32a, 32b eliminates the delay time caused by the long zoom stroke being required to increase the magnification from a wide view of the field 20 to a zoomed view of a barcode 64. While the camera system 14 scans the field 20, the touchscreen 54 displays an image of the field from the fixed camera 32a. When the operator selects a tag 60 on the touchscreen 54, the touchscreen 54 then displays an image from the second camera 32b while it centres the tag 60. Since the tags 60 may be affixed at varying distances, the second camera 32b will make necessary minor adjustments to achieve the desired magnification while centering takes place. Both cameras 32a, 32b are mounted on the pan/tilt mechanism 40, and thus move together to maintain a constant relationship of the location of the tag view within the field of view of the fixed camera 32b.

During operation, one camera (e.g. 32a) is designated as a field camera, and the other camera (i.e. 32b) is used at the tag camera for reading barcodes. The field camera 32a has a fixed focal length, aperture and focus settings. The image size, and depth of field are set so that all coils 22, no matter what height, are in focus. The overview image is provided to the operator, so that they can select the location (i.e. barcode tag) to enable the tag camera 32b to locate the tag 60 for reading the barcode 64. The field camera 32a monitors the output of the user interface touchscreen 50, looking for tag identification "touches" or other suitable commands to indicate such identification.

Once the barcode 64 has been identified by the operator, the camera 32a attempts to identify the barcode 64 and locate its center, to thereby increase the accuracy of the pointing instruction to the pan/tilt mechanism 40. If the attempt fails, the pan/tilt command defaults to the exact position that the operator touched. Once the pointing operation is complete, the field camera 32a flags the tag camera 32b to begin the tag reading process.

The tag camera 32b has a motorized zoom lens, which is capable of adjusting image size, aperture (brightness and depth of field), and focus (object height). Image size is set by the operator, who may specify whether the coil is on the floor or on a truck bed as explained above. The aperture is held constant, and focus may be scanned to optimize image sharpness for the barcode read.

The tag image may be provided to the operator for manual centering using the touchscreen 50, or to be able to read the tag number in case the barcode is unreadable. The tag camera 32b operates to execute the identification process 109 described above. It will be appreciated that the camera 32b may process the image with an internal processor or may send images to an off-camera processor for processing.

It will be appreciated that the second embodiment described herein includes all of the features of the previous embodiment with an increased zoom speed imparted by use of a pair of smart cameras 32a, 32b shown in FIG. 8, and described above.

The identification process 109, particularly the alignment step 114 described above is most accurate when reading tags 60 that are affixed to objects have a substantially planar upwardly facing surface, or when the tags 60 are more or less ensured to be affixed such that their alignment is substantially parallel to the floor 20. When tags 60 are affixed to rolls of steel 22, the inherent curvature of the upward facing surface of the roll often places the tag 60 at a difficult angle for viewing the alignment markers 62 described above, e.g. when the tags are positioned on a sloping surface of the roll 22.

An alternative procedure for aligning a tag 160 is shown in FIGS. 9a-9d and 10-11, which is most suitable for centering tags 160 that are likely to be affixed to an object having a sloping surface. In this embodiment, like elements are given like numerals with the prefix "1".

An image 154 may be obtained according to steps 102-112 shown in FIG. 7, using either the one-camera or two-camera system. The following description is directed towards a two-camera system, but should hold true for a single camera system with different zoom levels, since different zoom levels are inherently at different resolutions. In a two-camera system, when the field camera 32a sends instructions to the pan/tilt mechanism 40 to center the tag camera 32b on a barcode, it is common for the tag 160 to be off-center in the tag camera's field of view. This occurs because the resolution of the tag camera 32b is typically much greater than that of the field camera 32a, and thus, a single pixel shift (horizontal or vertical) command to the pan/tilt mechanism 40 from the field camera 32a, translates to a several pixel shift in the field of view of the tag camera 32b.

Figure 9A:
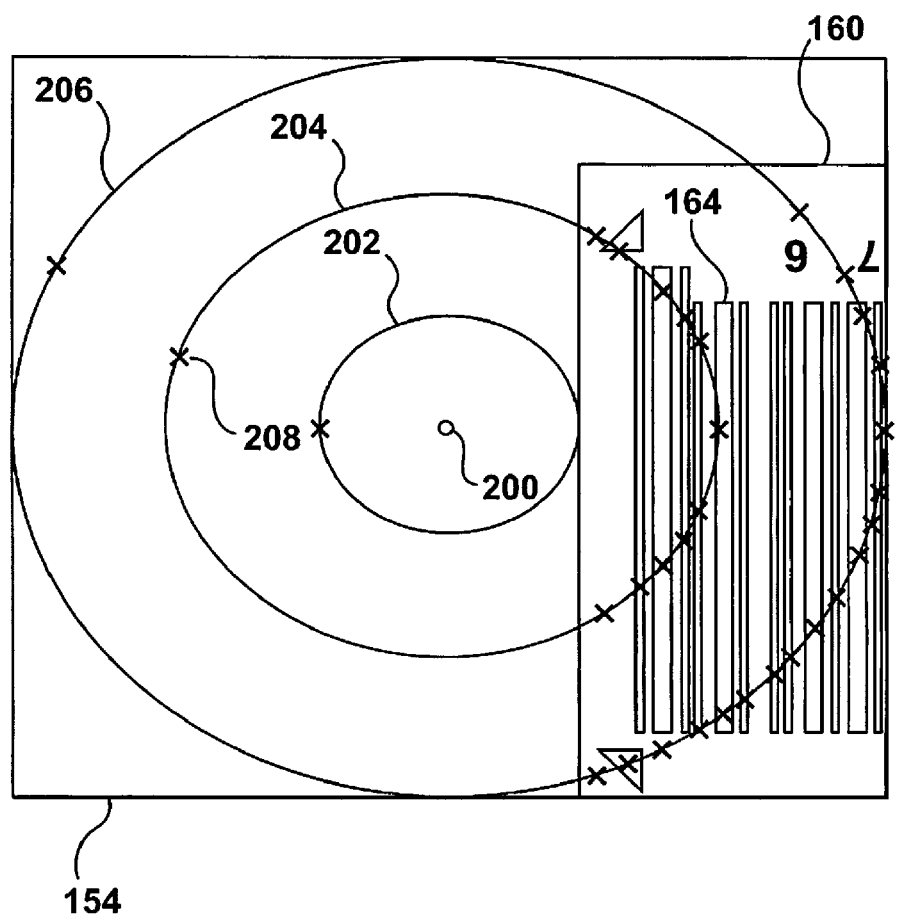
FIGS. 9a-9d are diagrams pictorially showing steps in a tag alignment procedure.
Figure 9B:
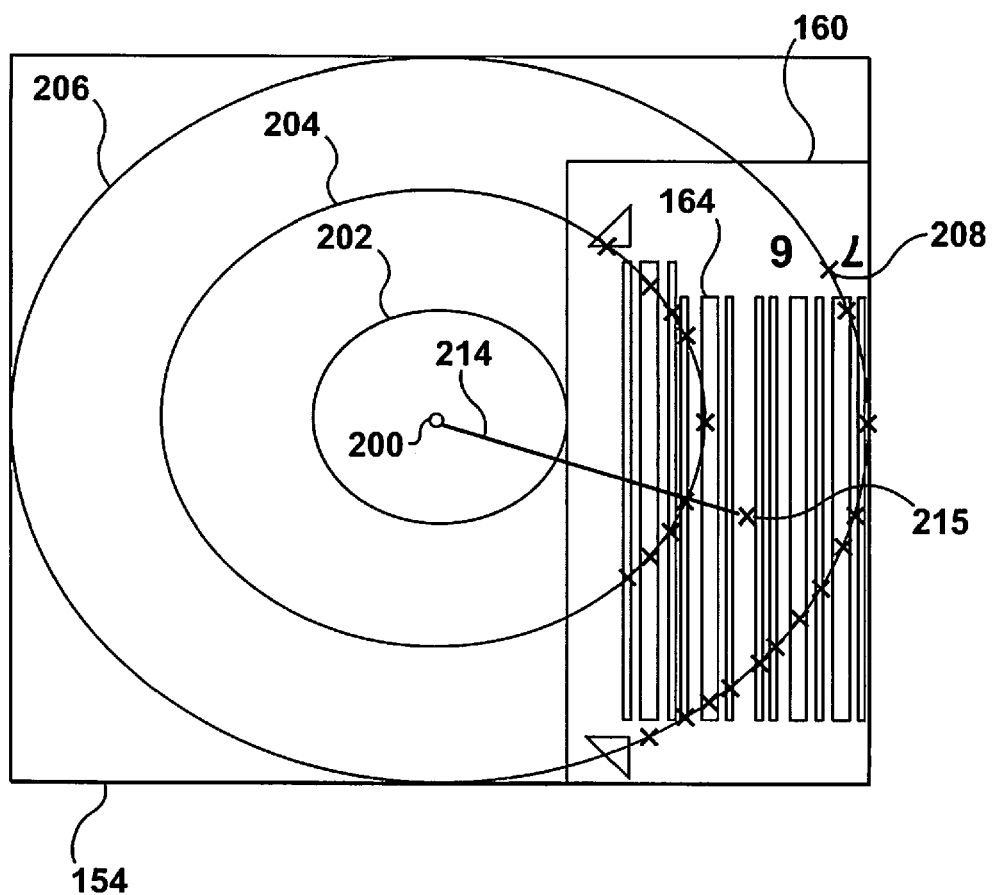
Figure 9C:
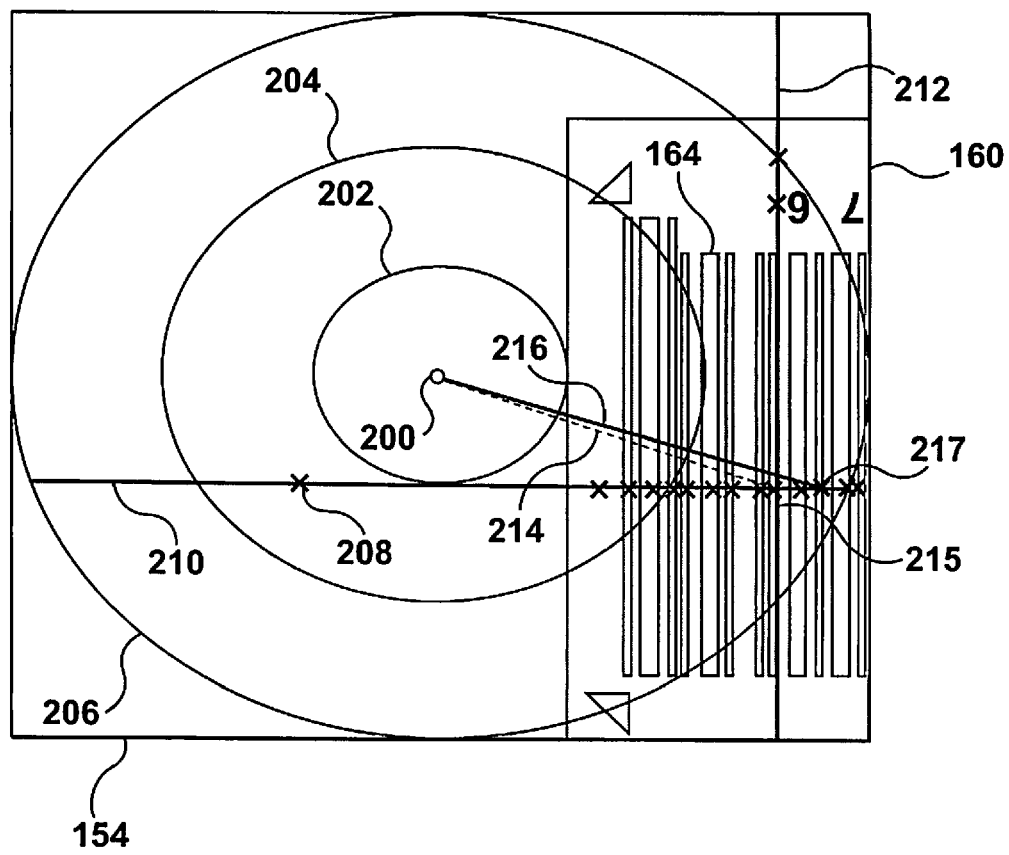

As shown in FIGS. 9a-9c, a portion of the barcode 64 may be cut-off in the image 154, as well as some of the alignment markers 62. The alternative procedure shown in FIGS. 9a-9d enable the tag camera 32b to be repositioned in order to orient the barcode 64 such that it is visible for subsequent scanning (i.e. in a desired orientation). Preferably, the centering operation is executed for each scan, regardless of the accuracy of the coarse adjustment caused by the "touch" of the operator. When a tag 160 is accurately centered after the coarse adjustment, only a minor additional time overhead is required, however, when the tag 160 is substantially off-center, the procedure can save several seconds from the read operation when compared to having the operator initiate a manual re-centering.

The alternative procedure for aligning tags 160 uses a series of virtual sensors implemented in a software routine to conduct scans along defined paths in the image 154 to identify or "sense" segments. Segments are regions of similar intensity, differentiated from other regions by an intensity gradient, which is preferably user selectable. Each scan effectively causes a "soft" sensor to interrogate the image and mark or identify segments that it intersects. Preferably, three concentric sensors are used. In the embodiment shown in FIG. 9a, three sensors each scan an oval path (inner 202, mid 204, outer 206) to define concentric zones arranged from the center of the image 200 out to the edges of the image field. A marker 208 is placed on the image within each segment identified by a sensor. The number of these points in the image is indicative of distribution of segments in the image.

Figure 9D:
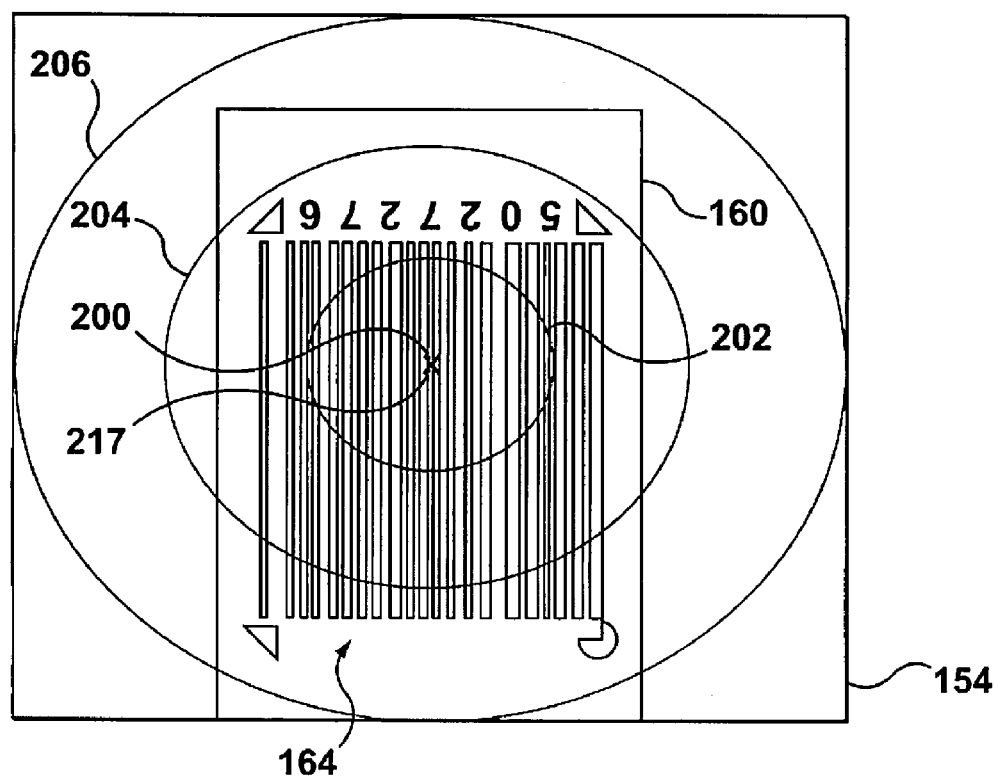

A well centered tag 160 should produce an equal distribution of segments, and thus markers 208, about the center of the image 154, such as that shown in FIG. 9d. In such a case, the segment positions would then cancel each other out, to produce an average position of the segments, near center 200. A tag 160 that is towards one side of the image field, e.g. FIGS. 9a-9c, will cause an imbalance in the number of segments on that side, resulting in the average segment position being shifted towards that half of the image 154. In FIGS. 9a-9c, the barcode 164 is located towards the bottom right portion of the image 154, and reports a large number of small segments in that area. Small segments are segments that are of a particular size, measured in pixels, e.g. <10 pixels, and are likely to indicate the presence of a barcode bar (white or black). An average 215 of the position of these small segments, measured from the center 200 computes a vector 214 (see FIG. 9b).

Referring to FIG. 9c, a horizontal sensor 210 and vertical sensor 212 can also be used to provide greater accuracy. These sensors scan along the image at the average position 215 as shown in FIG. 9c, and are used to adjust the average position 215, to determine a second average position 217, that better represents the centre of the barcode 164. A second vector 216 is then produced that more accurately reflects the offset of the barcode 164. For a horizontal barcode, e.g. FIGS. 9a-9c, the oval segmentation sensors 202-206 would provide the vertical offset, and the horizontal sensor 210, the horizontal offset. Similarly, for a vertical barcode (not shown), the oval sensors would provide the horizontal offset, and the vertical sensor 212, the vertical offset.

The following describes the alternative procedure for aligning the tag 160, in greater detail, making reference to FIGS. 9a-9c, 10 and 11. In the image 154 shown in FIG. 9a, the three oval sensors 202-206 are configured to mark segments that are at least 5 pixels in size, which is the typical width of the smallest barcode bar. It will be appreciated that this procedure may be used for aligning other indicia such as an alpha-numeric string, wherein the threshold of 5 pixels may be adjusted to recognize, e.g., the smallest possible character width.

An edge contrast may be used to identify barcode segments, and is determined through experimentation during an initial calibration. A suitable range is 7-15%, which is high enough to ignore minor noisy segments, but low enough to pick as many valid barcode segments at a relatively poor focus as possible.

Figure 10:
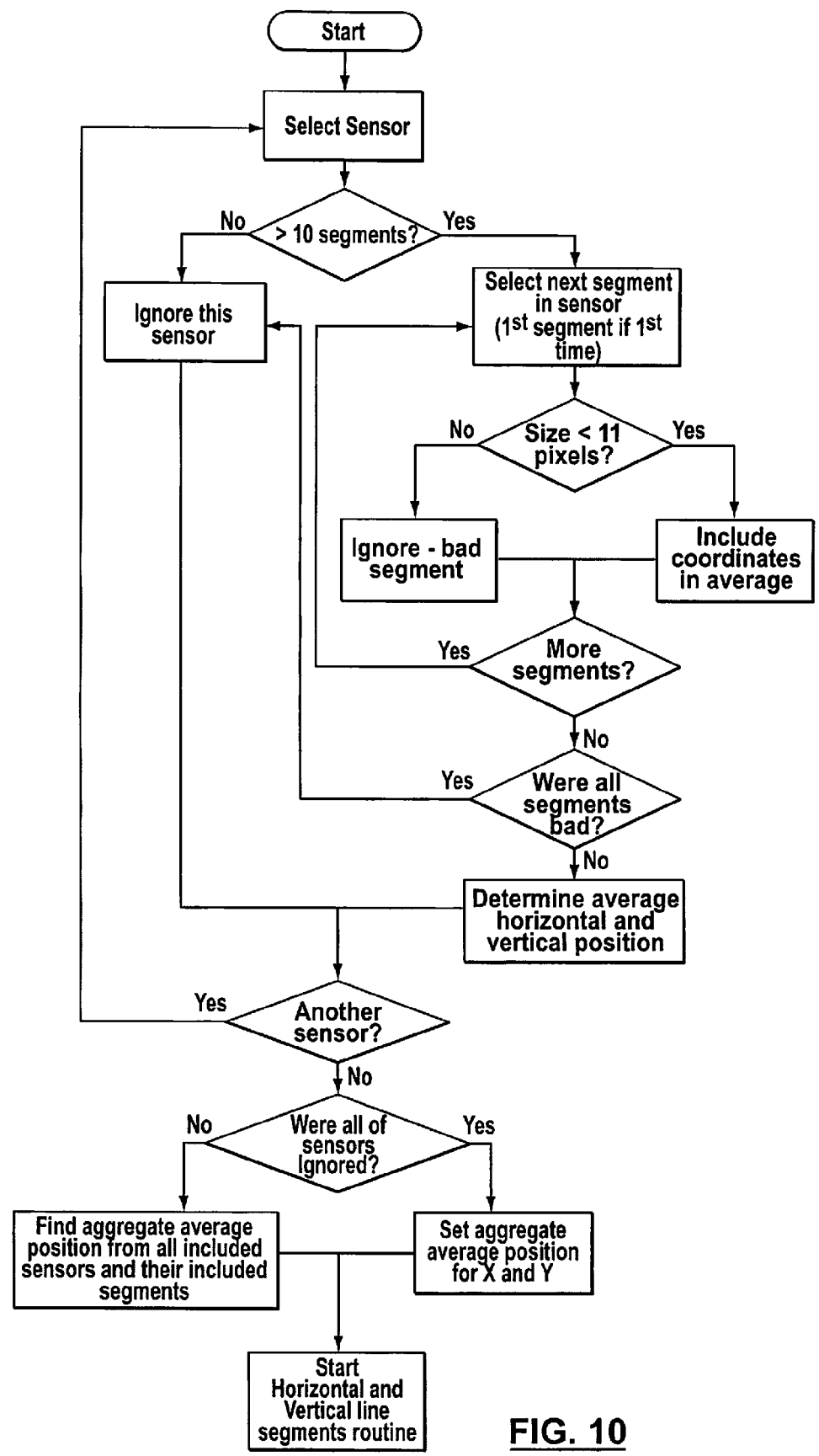
FIG. 10 is a flowchart illustrating the steps performed in the tag alignment procedure of FIG. 9.

As shown in FIG. 10, when the alignment procedure is executed, a script examines each segmentation sensor 202-206 in turn, and determines the number of segments identified by each sensor. First, the sensor of interest is chosen, e.g. starting with sensor 202, and the number of segments is then determined and compared to a threshold, e.g. 10. If the number of segments is less than 10, chances are that there is no barcode intersecting the sensor 202, just background noise. In FIG. 9a, it can be seen that sensor 202 has only 1 segment, and would therefore be ignored in calculating the offset of the tag 160. However, the next sensor, e.g. 204, clearly has more than 10 segments, and would therefore be used to calculate the average segment position 215 (shown in FIG. 9b).

Since segments on a barcode 164 should not, ideally, be larger than a certain threshold, e.g. approximately 10 pixels, those that are larger than the threshold are ignored, eliminating stray segments, background segments etc. This ignores the curvature of the path in which the sensors may perform their scan. An oval path may report a larger segment width since the path in which it travels may not traverse the segment along the shortest path. This would result in a measured segment width that is larger than that of the segment's true size. Segments can also be identified as larger than they truly are, if adjacent barcode bars are missed due to poor focus etc. The threshold is chosen to accommodate operational variations.

Turning to FIGS. 9a and 10 specifically, since sensor 202 has been ignored, sensor 204 is next analysed. There are greater than 10 segments according to the image 154 in FIG. 9a, therefore, the first segment is selected, and its size determined. If the segment selected is smaller than the threshold, i.e., 10 pixels or less, its coordinates are saved to include in the average position. This is repeated until each segment has been analysed. As long as at least one of the segments has not been determined as "bad", i.e., above threshold, an average horizontal and vertical position are determined based on all coordinates saved during the analysis.

The above process is repeated for each sensor, which in the example shown in FIG. 9a would involve one more iteration to evaluate sensor 206. If it was determined that all sensors were ignored, the aggregate average position is set to the center 200. If at least one of the segments has not been ignored, an aggregate average position 215 using all included sensors (these are shown in isolation in FIG. 9b), and all included segment positions is found. This calculation produces vector 214 shown in FIG. 9b.

Once all sensors have been analysed, the horizontal and vertical segmentation sensors may be used, as shown in isolation in FIG. 9c. It will be appreciated that using the horizontal 210 and vertical 212 sensors may be an optional procedure, however, the use thereof does provide a more accurate determination of the center of the barcode 164.

Figure 11:
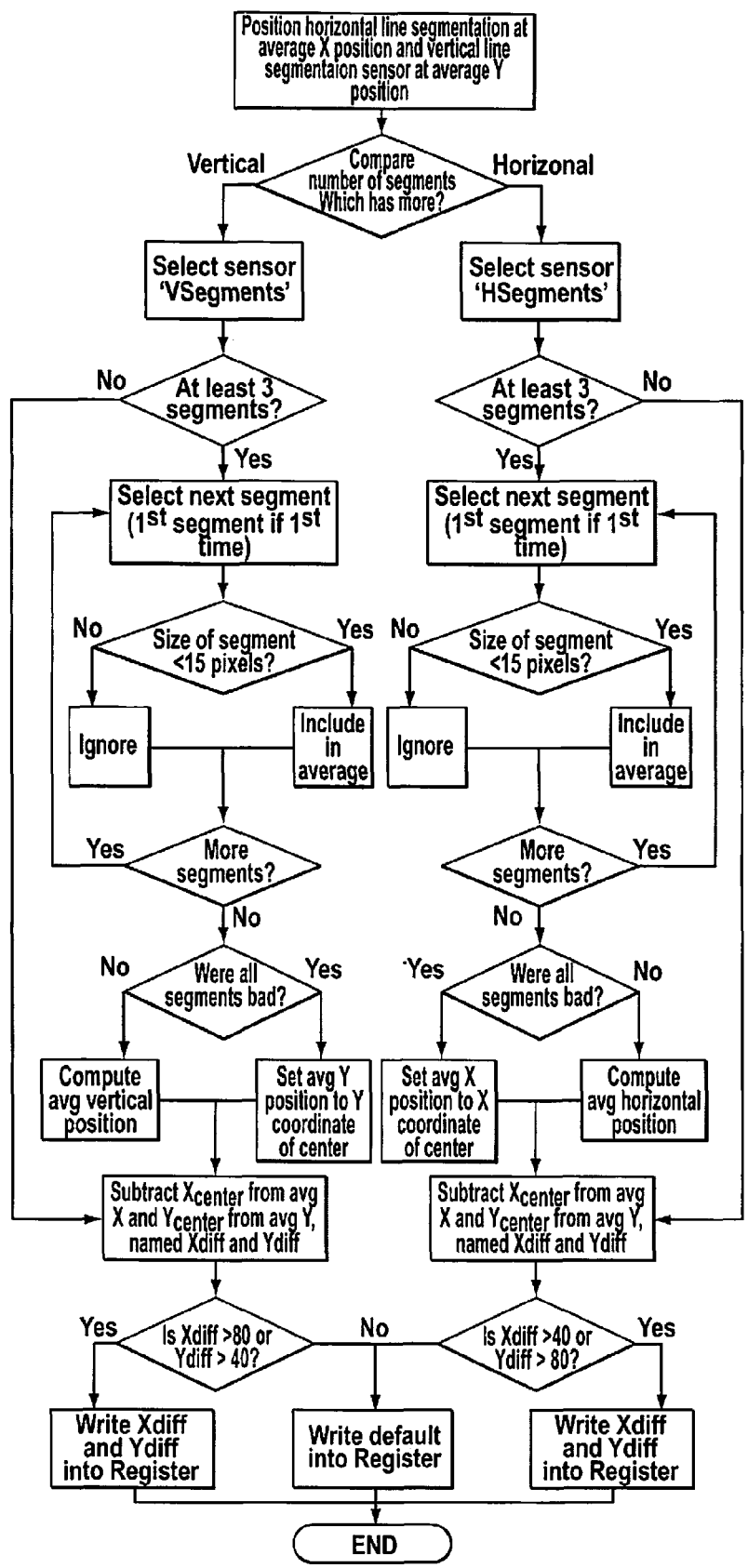
FIG. 11 is a flowchart illustrating steps that continue from the flowchart of FIG. 10.

The steps in using the horizontal 210 and vertical sensors 212 is shown in FIG. 11, making reference to FIG. 9c. The horizontal sensor 210 is placed along the image 154 at the average vertical position (i.e. Y coordinate of 215) determined according to FIG. 10. Similarly, the vertical sensor 212 is placed along the image 154 at the average horizontal position (i.e. X coordinate of 215). A script will determine which line sensor (210 or 212) has a greater number of segments, to decide whether the barcode 164 is oriented vertically or horizontally. It is clear from FIG. 9c that the horizontal sensor 210 has a greater number of segments, and the barcode 164 is clearly oriented in a horizontal fashion.

In this example, since the horizontal sensor 210 has a greater number of segments, the process continues on the right hand path shown in FIG. 11. Once the proper sensor has been chosen, the number of segments identified by that sensor is determined, and if there are fewer segments than a particular threshold, the process is bypassed. In FIG. 11, that threshold is three (3) segments. If the horizontal sensor 210 has identified three or more segments, which in FIG. 9c is true, a loop commences that measures the size of each segment, and if the segment is smaller than a threshold, e.g., 15 pixels, then the coordinates of that segment are to be included in the second average position 217. Similar to the oval sensors, this process is repeated for each segment until all have been analysed.

If all segments were bad, the average X position is set to the X coordinate of center 200, and if not, an average X position is computed for all included segments. Differential X and Y measurements are then calculated by subtracting the X coordinate of center 200 from the average X position and the Y coordinate of the center 200 from the average Y position. In this example, the average Y value remains the one calculated by the oval sensors. The differential measurements are then compared to respective thresholds, and if the differential measurements are not above those thresholds then the barcode 164 is within the suitable limits and a move is not required. If however at least one of the X or Y differential measurements are greater than its respective threshold, a second vector 216 extending from center 200 to the position dictated by the X differential and Y differential measurements, i.e. 217, is computed. This vector 216 provides a better estimate of the center of the barcode in the horizontal direction, as shown in FIG. 9c.

It will be appreciated that the steps taken for measuring a vertical barcode are similar to those that have been described above, and therefore, need not be reiterated.

As long as at least one of the differential measurements is greater than its respective threshold, a pan/tilt operation will be performed by the pan/tilt mechanism 40, which aligns the tag 160 within the image as shown in FIG. 9d. At this point, the imaging system 14 will analyse the image and determine if further adjustment is needed, or if a particular scan direction is needed. For example, the tag 160 is oriented "up-side-down", and thus the barcode scan operation would need to take this into account. The imaging system 14 may then determine the up-down/left-right orientation and scan accordingly.

To achieve the most accurate results: a reasonable focus should be used so that the maximum number of barcode segments may be encountered; a reasonably consistent background is preferred, which is difficult to control, however should be considered; and if possible, having no other tags within the field of view of the cameras 32a, 32b is also preferred, to minimize confusion with the background.

It will be appreciated that the above alternative alignment procedure can be used in place of the procedure shown in FIGS. 5a and 5b, and the choice of which procedure to use, is dependent on the application. For instance, in an application where the objects being scanned are rectangular, e.g., shipping containers, either alignment procedure is suitable. On the other hand, in applications where the objects are curved, e.g., rolls of steel, the alternative alignment procedure is more appropriate.

The tag alignment procedure shown in FIG. 9 can be prone to mis-alignment in less than ideal conditions, e.g. where the tag 60 is out of focus. In many practical applications, the system performs a tag centering operation prior to focussing the tag in order to reduce inspection time. If the system first performs the focus operation, it is likely in many instances that there is not a great deal of the barcode 60 in the image and thus will have to perform a tag centering procedure and then re-focus the tag. Ideally, the tag centering procedure should only be performed once since, every time the procedure executes, the inspection time increases and the inherent time delays due to mechanical movements are also increased.

Figure 12:
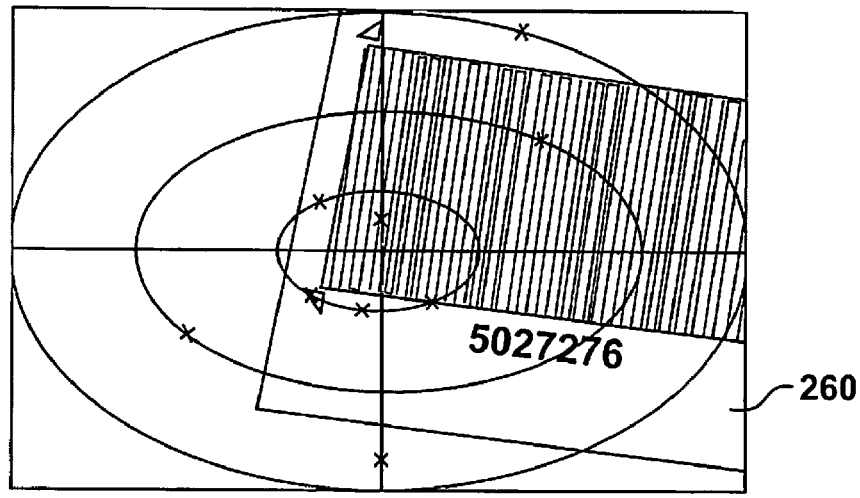
FIG. 12 is a diagram showing a misaligned barcode using the tag alignment procedure in FIG. 9.

In cases such as that shown in FIG. 12, poor focus and/or poor initial alignment can result in too few segments being detected. The resultant segmentation shown in FIG. 12 would determine that the tag 260 is almost perfectly centred and no movements are necessary when in fact a correction is needed to align the tag 260. Such a false positive can be attributed to the sensitivity of the line sensors and the poor image focus (poor focus not shown in FIG. 12 in the interest of clarity). In order to overcome the potential shortcomings of the use of the procedure shown in FIG. 9, another embodiment, shown in FIG. 13 can alternatively be used.

Figure 13:
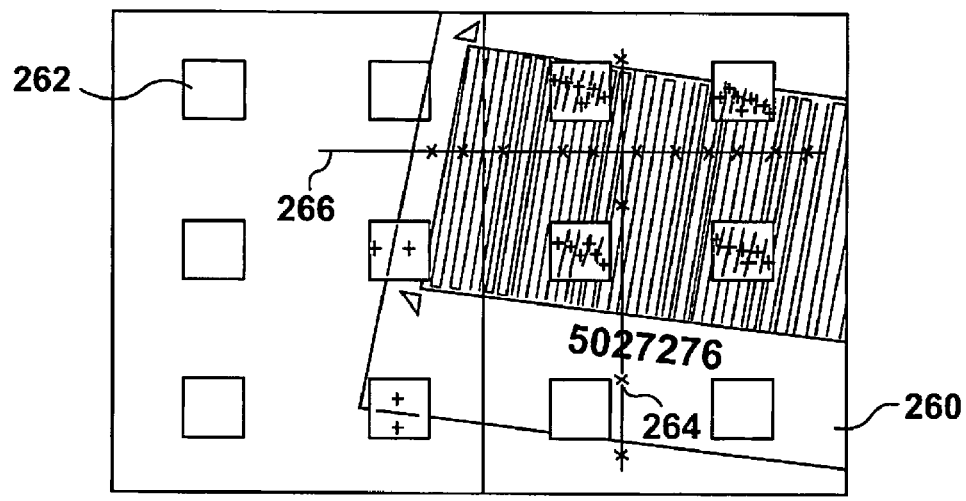
FIG. 13 is a diagram showing yet another tag alignment procedure.

Referring now to FIG. 13, an array of square area segments 262 are evenly arranged throughout the image. Area sensors 262 are typically more robust than line sensors since, by definition, the sensors 262 detect within an area (i.e. 2-D) as opposed to only the pixels that are included in a 1-D line. Line sensors, as discussed above, detect single white-to-black-to-white transitions and thus depend a single 1-D transition. The area sensors 262 are capable of correlating 2-D boundaries in its respective area.

Each sensor 262 looks for 2-D segments of the same geometric property as a typical barcode strip having the same magnification (based on data that can be pre-stored). Each of the sensors 262 is associate with a respective offset value measured with respect to the origin (0, 0) of the image (e.g. centre). For example, the sensor 262 in row 1, column 1 (i.e. upper left corner) has an x-offset of −240 and a y-offset of −160, while the sensor 262 in row 2, column 3 has an x-offset of +80 and a y-offset of zero (0). If the number of 2-D segments detected in a particular area exceeds a predetermined threshold (e.g. 5), then its predetermined offsets are added to a total offset, which includes an average of all applicable offsets. The threshold is used to exclude sensors 262 such as row 2, column 2 whose segments do not contribute to identifying the location of the barcode 64 but may have detected other features of the tag 60.

The predetermined offsets for all applicable sensors 262 are added together and averaged to determine an approximate total (x, y) offset. In the example shown in FIG. 13, sensors (1, 3), (1, 4), (2, 3) and (2, 4) contribute to the offset calculation and the approximate offset is found to be (160, −80), i.e. move the tag left by 160 pixels and down by 80 pixels.

Preferably, in order to fine tune the offset calculation, a horizontal line sensor 266 and a vertical line sensor 264 are placed at the approximate offset (e.g. 160, −80) and the segments detected along them are incorporated into the offset calculation. The line sensors 264, 266 are used to accommodate horizontally and vertically placed barcode tags 60. The one that finds the most segments along its length (preferably subject to a predetermined threshold), determines the orientation of the tag (e.g. horizontal in FIG. 13) and contributes to the final offset calculation. The average of all the segments found by the line sensors 264, 266 adds a fine adjustment to the approximate offset resulting in the final offset. In the example shown in FIG. 13, the final offset is (122, −106).

To create a true one-touch centering operation, and to reduce misreads, the cameras 34a,b can be instructed to return to their home position (aimed at the normal barcode position on a coil directly under the picker 16) and initial state (zoom, iris level, starting focus) when a preset idle time is exceeded after each read operation. While the operator moves to the next coil, the cameras can reset themselves for the next one-touch operation whereby the two cameras move together to a preset orientation under the control of the pan/tilt unit 34 and the adjustable lens returns to its "home" zoom position etc.

A screen shot of an application program interface (API) 400 provided on the touchscreen 54 is shown in FIGS. 14-18 for the two-camera arrangement shown in FIG. 8. The API 400 provides a field view 401 from one lens 34a and tag view 403 from the other lens 34b. The views 401, 403 preferably use a tab organization such that an operator can easily switch to an enlarged tag view 403 by simply touching the tag view tab. The API 400 also comprises a status bar 402 for indicating the current operation being performed by the system 10. In FIG. 14, the status bar 402 instructs the user to press on a tag in the field view (see FIG. 4) to begin the barcode read. Once the user presses the tag 60, the centering and zoom operations are performed and an image of the tag 60 is provided in the tag view 403 where a centering operation takes place and the barcode is then read. Once the barcode 64 has been read, it will be displayed on a barcode display 404. The laser rangefinders 13a, 13b continuously determine the (x, y) coordinates and correlate these to a floor location, which is shown in a location display 405.

Figure 18:
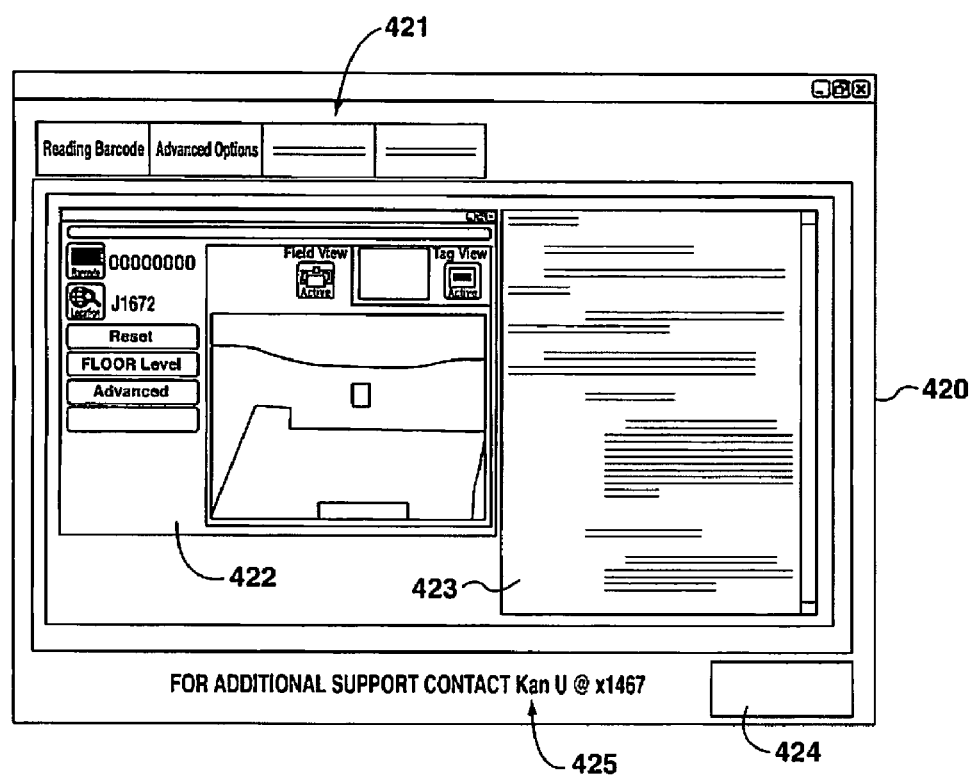
FIG. 18 is a screen shot of a graphical help manual.

The API 400 also comprises a reset option 406 that is used to reload the software, a floor layout indicator 407 (showing "floor level" in FIG. 14), an advanced option 408 for adjusting configuration settings, and a help option 409 that loads a graphical help manual (see FIG. 18).

Figure 15:
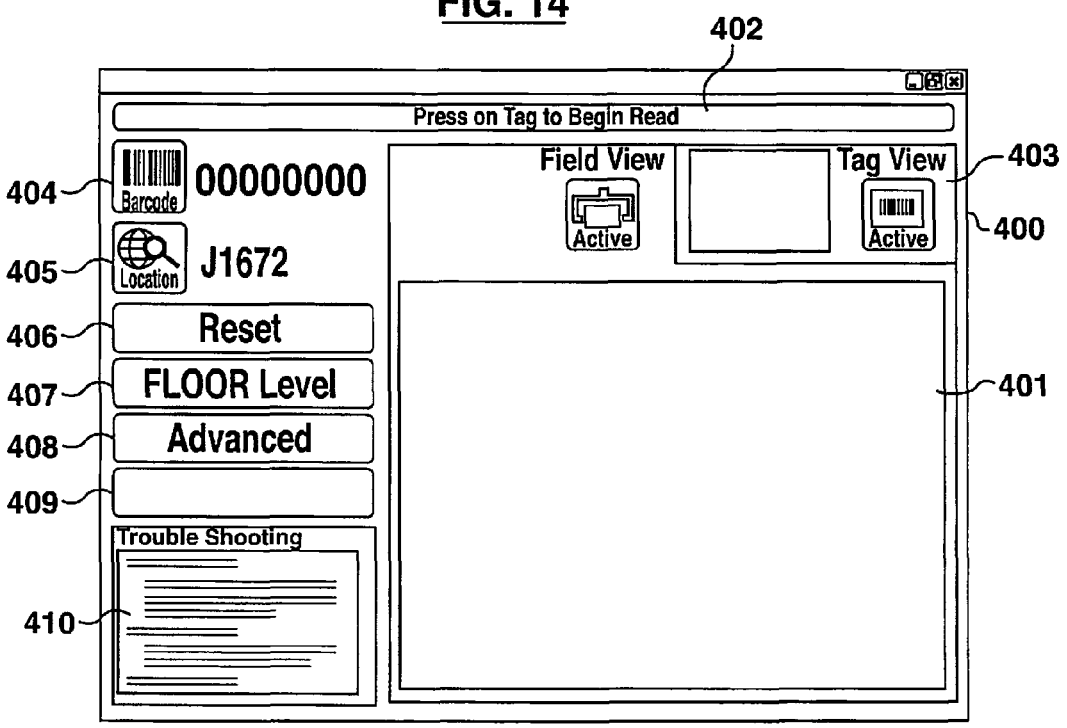
FIG. 15 is a screen shot of the embodiment of FIG. 14 showing a laser rangefinder failure.
Figure 16:
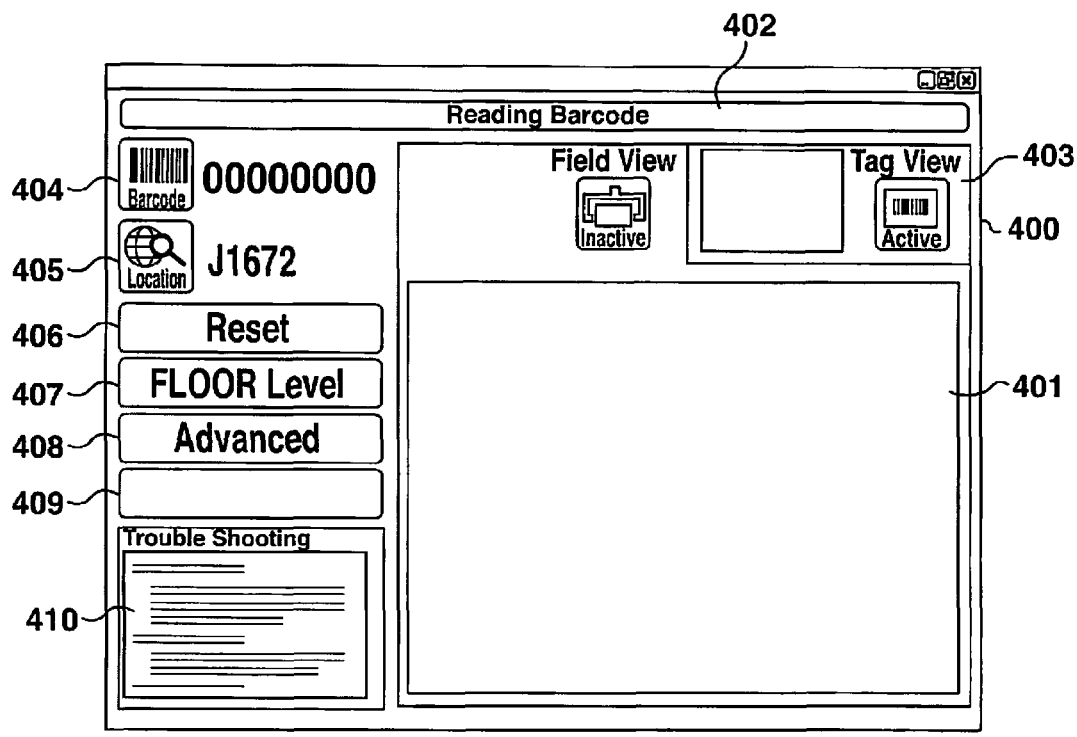
FIG. 16 is a screen shot of the embodiment of FIG. 14 showing a camera connection failure.

The API 400 checks its communication ports to see whether a continuous stream of data is being received from the laser range finders 13a, 13b. A stop watch algorithm is used whereby each time a new set of data is received, the starting time is reset and the time elapsed returns to zero and starts over. If the ports remain inactive for a period of time (e.g. 10 seconds), the API 400 will display a troubleshooting window 410 giving an overview of the problem and possible causes and remedies as seen in FIG. 15. To attract the user's attention, the location display may change colour and the reset option 406 is highlighted to reflect a new set of commands when selected.

The troubleshooting window 410 first states the date, time and the problem encountered. This information is appended to an external log file for archiving. A sequential trouble shooting guide is then listed. Under normal operations (FIG. 14), the reset button instructs the cameras 34a,b to resume their initial states and recalibrates the mechanical movements of the pan/tilt mechanism 40. During an operational error such as that described above, the reset button 406 changes colour and pressing it reloads the API 400 instead of sending a command to the cameras 34a,b and pan/tilt mechanism 40. The reload operation is to eliminate the possibility of a software glitch from the diagnostic tests. For example, the reload may indicate that a software glitch interrupted communications with the laser range finders 13a, 13b rather than a physical connection being lost which can save unnecessary troubleshooting.

The above-described polling progress is preferably continuous and thus once the problem has been fixed, the troubleshooting window 410 automatically disappears and the icons return to their original colours and functions.

Similarly, if a touch command sent to the cameras 34a,b via the camera display 401 is broken, the field view icon turns red and the troubleshooting window reappears (see FIG. 16) with relevant troubleshooting tips. Preferably, the API 400 is capable of reflecting more than one problem simultaneously. Active monitoring is preferably done at the level closest to the control console 18, Since the pan/tilt unit 40 and motorized lenses 32 are directly connected to the tag view camera, it periodically polls for a response. The system will try to re-establish a connection once a response is not received, after a particular threshold. The camera 34 passes a parameter to the API 400 indicating the problem as noted above.

Figure 17:
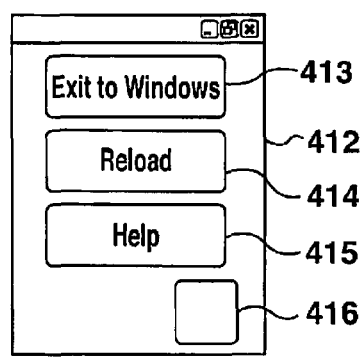
FIG. 17 is a screen shot of a help menu.

When the operator presses the help option 409 a help menu 412 as shown in FIG. 17 is displayed. The operator has the option of exiting the API 400 by pressing option 413 to access the native PC desktop (preferably password protected). The API 400 can be reloaded by selecting the reload option 414, the help option can be exited by selecting option 416, and a help manual can be loaded by selecting the help option 415.

An example help manual 420 is shown in FIG. 18. Various tabs 421 are provided for providing troubleshooting tips for particular operations. A graphical display 422 and a textual display 423 are provided for each tab to assist the operator in diagnosing the problem. An exit button 424 is provided and contact information 425 for further support. Preferably, advance options are provide to enable an operator to configure the system 10 settings, such as the shutter speed, light intensity and zoom levels for calibration purposes.

Figure 21:
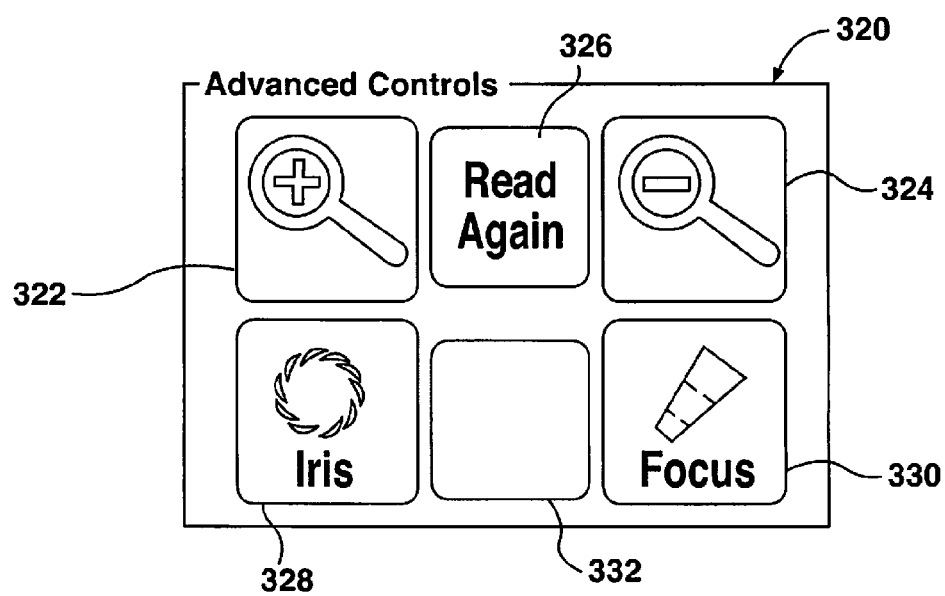
FIG. 21 is a screen shot of an advanced options menu.

An example advanced help manual 320 is shown in FIG. 21. This menu 320 allows the operator to perform manual zoom in 322 and zoom out 324 operations as well as adjust the iris 328 or adjust the focus 330 manually. The operator is also given the option to read the tag again 326 and exit the manual 332 when finished with the advanced options. It will be appreciated that any number of advanced options can be provided and may be guarded by a password protection mechanism to prevent unauthorized tampering.

Often, a shipping or storage facility includes more than one crane and thus includes more than one identical system 10 running the same software in the same building. In order to differentiate between two or more systems, an identifier for each system can be used, e.g. using a hardwired parallel port dongle. A different wiring combination can give each dongle a hard coded identifier. The dongles are physically attached to the system's parallel port and its identifier is automatically retrieved during system login, which accurately recognizes each system without human error. A lookup table can then be used to match the system identifier with the rest of the crane information such as weight, model and make. The system identifier allows the equipment to be completely portable so that it can be swapped between cranes during maintenance periods or if a machine is decommissioned When the system initiates it can automatically determine the crane in which is has been installed and avoids the operator having to remember to update settings or enter such settings. It will be appreciated that the system identifier can also be set in software and, where only one crane exists in the same building, this option can be disabled.

As shown in FIG. 1, the system 10 interfaces with an inventory control 24. The inventory control 24 and the camera system may be fully integrated into a single system or may operate independent of one another while interfacing with each other as shown. In one embodiment (not shown) the API 400 includes a window for the camera system and a window for the inventory system but may also utilize a tabbed window to enable the operator to switch between the two interfaces. For a more ergonomic arrangement, a separate display (not shown) can be used to display an inventory interface on a separate display from the one shown in FIG. 3.

Separate interfaces may be considered if the camera control system and inventory control system require different levels of authority for access. If access to the inventory system is limited to an operator, a read-only display could be provided without write capabilities. Also, security issues may dictate whether or not the inventory system and camera system can be integrated. In an integrated system, the camera sub-system sends location and barcode information that is already obtained to the inventory sub-system for updating or cross-referencing.

In a fully integrated system, an incoming coil 22 enters the facility on a truck bed, and the driver submits a billing sheet with an ID for the coil to an inventory control person or scans it into the system. The D is loaded into the database and the inventory control 24 determines historical data and physical data to determine the best spot for the coil 22. For example, the inventory control would have access to the floor layout and the look-up table showing available locations. The location and coil information may then be sent to the crane cab 18 whereby the coil tag 60 is first scanned to confirm that the coil matches the billing sheet and the coil 22 is lifted and placed at the appropriate location. With a sophisticated crane, a fully automated placement can be performed since the system 10 can find a location using the range finders 13a, 13b and can interface with the inventory control 24 to match a vacant spot with a location. Ideally a proximity sensor or the camera 14 system can be used to confirm that a spot is vacant before the coil 22 is lowered.

Once the coil 22 is placed, API 400 notifies the inventory control 24 which in turn updates its database to "fill" the vacant spot. For an outgoing item, a lift ID can be entered into the system either in the crane or from a remotely operated console (not shown). The lift ID is used to find the location for the coil 22 which in turn commands the crane or notifies the operator in the cab of the location. The location can be used automatically or manually to locate the coil 22. The tag is then read to confirm the inventory and the coil 22 is hoisted and placed on an outgoing truck.

The above example can be fully automated or partially automated depending on the capabilities of the system and the safety requirements. An operator may be used but placed outside of the crane in an office. By using the illumination system 308, the facility would not require lighting in a fully automate embodiment but only require the localized light that is only provided when a coil is being placed or retrieved.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

What is claimed is:

1. A method for remotely scanning objects comprising the steps of:
   using an imaging system to display an image of said objects on an interface;
   receiving a location input of an identification tag attached to a desired object based on a location in said image;
   using said location input to orient said imaging system towards said identification tag;
   magnifying said identification tag;
   analysing said image using an array of two-dimensional sensors to determine the deviation of said tag within said image with respect to a preferred position;
   aligning said tag by adjusting said orientation; and
   reading information identifying characteristics of said desired object provided by said tag.

2. A method according to claim 1 wherein said location input is correlated to a field position determined by a range finder system, said correlation being used to determine the location of said desired object in said field.

3. A method according to claim 1 comprising the step of illuminating the field of view of the imaging system.

4. A method according to claim 1 wherein prior to displaying said image, said method comprises the step of obtaining a system identifier code.

5. A method according to claim 4 wherein said system identifier code is provided by a dongle connected to said imaging system.

6. A method according to claim 1 wherein said imaging system includes a first camera having a fixed magnification and a second camera having an adjustable magnification for performing said step of magnifying said identification tag.

7. A method according to claim 6 wherein said first camera maintains a fixed magnification, such that said image includes a plurality of said objects; and said second camera includes a zoom lens that maintains a first magnification that corresponds to a predetermined estimate of the required magnification to focus said tag, and is operable between a plurality of magnifications to enable the magnification of said tag to be adjusted.

8. A method according to claim 1 wherein said imaging system includes a smart camera, said smart camera having an internal processor for executing said steps.

9. A method according to claim 1 further comprising the step of sending said information to an inventory control system for monitoring the distribution of said objects.

10. A system for remotely scanning objects comprising:
    an imaging system positioned remotely from said objects and arranged to image said objects, said imaging system having an adjustable lens for magnifying said image;
    an interface for displaying an image of said objects and adapted for receiving a location input for an identification tag attached to a desired object based on a location in said image; and
    a processor connected to said imaging system and said interface;
    wherein said processor uses said location input to orient said imaging system towards said tag, commands said adjustable lens to magnify said tag, analyses said image using an array of two dimensional sensors to determine the deviation of said tag within said image with respect to a preferred position, aligns said tag by adjusting the orientation of said imaging system, and reads information identifying characteristics of said desired object provided by said tag.

11. A system according to claim 10 further comprising a range finder system for determining the location of said desired object in said field and to correlate said location input to said location of said desired object in said field.

12. A system according to claim 10 further comprising an illumination system for illuminating the field of view of the imaging system.

13. A system according to claim 12 wherein said illumination system comprises a least one row of light emitting diode (LED) lights.

14. A system according to claim 13 comprising two rows of said LED lights and at least one row of infrared lights.

15. A system according to claim 10 comprising a dongle connected to said imaging system having a system identifier code.

16. A system according to claim 10 wherein said imaging system includes a first camera having a fixed magnification and a second camera having an adjustable magnification for performing said step of magnifying said identification tag.

17. A system according to claim 10 wherein said imaging system has an adjustment drive adapted for providing pan and tilt operations.

18. A system according to claim 10 further including an inventory control system connected to said processor, said inventory control system being used to receive said information identifying characteristics of said desired object from said processor, for identification thereof; wherein said inventory control system updates a record of said objects.

19. A system according to claim 10 wherein said imaging system includes a smart camera having an internal processor.

20. A method for aligning a tag in an image, said tag being affixed on an object and having indicia thereon, said method comprising the steps of:
   obtaining an image of said object having at least a portion of said tag visible in said image;
   arranging an array of two-dimensional sensors on said image;
   identifying markings in each of said sensors, said at least one marking indicative of the presence of a particular feature of said tag;
   computing an average position of said markings to determine a deviation of said average position from a preferred position; and
   aligning said tag in said image according to said deviation.

* * * * *

UNITED STATES PATENT AND TRADEMARK OFFICE
CERTIFICATE OF CORRECTION

| | | |
|---|---|---|
| PATENT NO. | : 7,721,967 B2 | |
| APPLICATION NO. | : 11/519778 | |
| DATED | : May 25, 2010 | |
| INVENTOR(S) | : Robert Eric Mueller et al. | |

It is certified that error appears in the above-identified patent and that said Letters Patent is hereby corrected as shown below:

Column 1, line 53: "due 3 the" should be "due to the"

Column 3, line 52: "the laser rangefinder system of FIG. 1" should be "a laser rangefinder system of the barcode scanning system of FIG. 1"

Column 5, line 61: "field 20 and in this particular" should be "field 20, which in this particular"

Column 6, line 30: "the numerical code 66 contains" should be "the numerical code 66 contain"

Column 9, line 64: "the other camera (i.e. 32b) is used at the tag" should be "the other camera (i.e. 32b) is used as the tag"

Column 10, line 37: "objects have a" should be "objects having a"

Column 12, line 60: "212 is shown" should be "212 are shown"

Column 13, line 22: "of center 200" should be "of the center 200"

Column 13, line 58: "which procedure to use, is" should be "which procedure to use is"

Column 14, line 27: "depend a single" should be "depend on a single"

Column 14, line 33: "is associate with" should be "is associated with"

Column 16, line 4: "control console 18," should be "control console 18."

Column 16, line 23: "are provide to" should be "are provided to"

Column 17, line 44: "automate embodiment" should be "automated embodiment"

Signed and Sealed this
Eighteenth Day of January, 2011

David J. Kappos
*Director of the United States Patent and Trademark Office*